(12) United States Patent
Volos et al.

(10) Patent No.: US 12,236,730 B2
(45) Date of Patent: Feb. 25, 2025

(54) SYSTEMS AND MACHINE LEARNING MODELS FOR AUTOMATED VEHICLE MONITORING

(71) Applicants: DENSO International America, Inc., Southfield, MI (US); DENSO CORPORATION, Kariya (JP)

(72) Inventors: Haris Volos, Sunnyvale, CA (US); Yunfei Xu, Milpitas, CA (US); Ravi Akella, San Jose, CA (US); Takafumi Okayasu, Southfield, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 224 days.

(21) Appl. No.: 17/961,752

(22) Filed: Oct. 7, 2022

(65) Prior Publication Data
US 2023/0343149 A1    Oct. 26, 2023

Related U.S. Application Data

(60) Provisional application No. 63/363,346, filed on Apr. 21, 2022.

(51) Int. Cl.
*G07C 5/04* (2006.01)
*G05B 13/02* (2006.01)
(Continued)

(52) U.S. Cl.
CPC .............. *G07C 5/04* (2013.01); *G05B 13/027* (2013.01); *G06Q 40/08* (2013.01); *G07C 5/085* (2013.01)

(58) Field of Classification Search
CPC ...................................................... G07C 5/04
See application file for complete search history.

(56) References Cited

U.S. PATENT DOCUMENTS 9,607,526 B1    3/2017 Hsu-Hoffman et al.
10,275,959 B2*  4/2019 Ricci ...................... G08G 1/164
(Continued)

OTHER PUBLICATIONS

Dong, Weishan, et al. "Autoencoder regularized network for driving style representation learning." arXiv preprint arXiv:1701.01272 (2017).

*Primary Examiner* — Michael A Berns
(74) *Attorney, Agent, or Firm* — Harness, Dickey & Pierce, P.L.C.

(57) ABSTRACT

An example computer system includes memory hardware configured to store a machine learning model and historical driving data vector inputs, and processor hardware configured to execute instructions including training the machine learning model with the historical driving data vector inputs to generate a reconstructed driving data output, wherein the reconstructed driving data output includes at least one reconstruction error score indicative of a likelihood that a driving data input corresponds to a desired driving behavior, obtaining a current driving data input, and supplying the current driving data input to the machine learning model to generate a reconstruction error score based on the current driving data input. The instructions may include determining a driving score according to the reconstruction error score, identifying at least one driver notification according to the determined driving score, and transmitting the identified at least one driver notification to a computing device or display.

20 Claims, 12 Drawing Sheets

(51) Int. Cl.
*G06Q 40/08* (2012.01)
*G07C 5/08* (2006.01)

(56) References Cited

U.S. PATENT DOCUMENTS

| | | | |
|---|---|---|---|
| 10,300,922 B2 | 5/2019 | Volos et al. | |
| 10,407,078 B2* | 9/2019 | Ratnasingam | B60K 35/00 |
| 10,417,929 B2 | 9/2019 | McQuade et al. | |
| 10,556,596 B2 | 2/2020 | Krishnamurthy et al. | |
| 11,124,197 B2* | 9/2021 | Heath | G08G 1/20 |
| 11,267,415 B2* | 3/2022 | Akella | B60R 16/037 |
| 11,989,749 B2* | 5/2024 | Scholl | B60W 40/09 |
| 2017/0072850 A1 | 3/2017 | Curtis et al. | |
| 2017/0097243 A1 | 4/2017 | Ricci | |
| 2017/0305434 A1 | 10/2017 | Ratnasingam | |
| 2020/0074492 A1 | 3/2020 | Scholl et al. | |
| 2020/0114928 A1 | 4/2020 | Heath et al. | |
| 2022/0317697 A1* | 10/2022 | Likhachev | G05D 1/0223 |
| 2023/0343149 A1* | 10/2023 | Volos | G07C 5/008 |

* cited by examiner

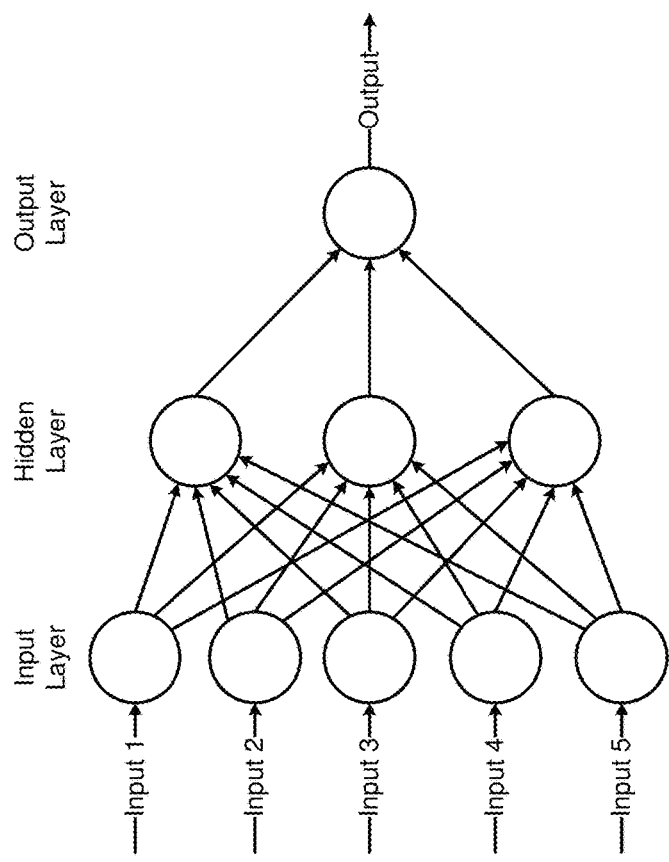 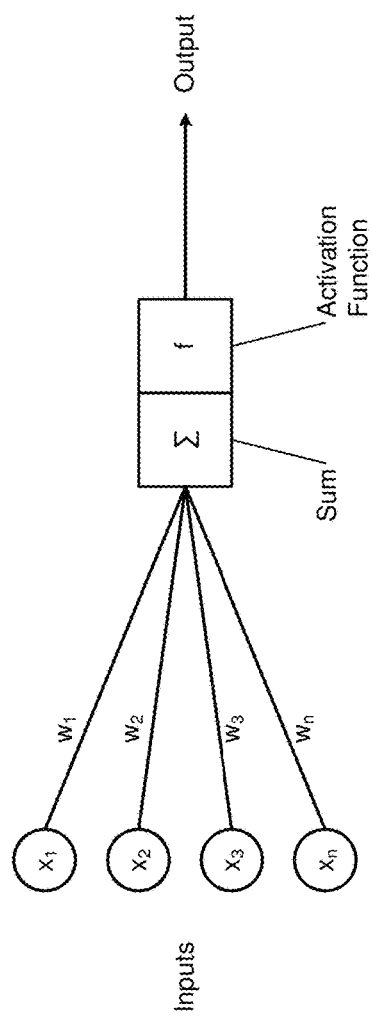
FIG. 3A
FIG. 3B

SYSTEMS AND MACHINE LEARNING MODELS FOR AUTOMATED VEHICLE MONITORING

CROSS-REFERENCE TO RELATED APPLICATIONS

This application claims the benefit of U.S. Provisional Application No. 63/363,346, filed on Apr. 21, 2022. The entire disclosure of the above application is incorporated herein by reference.

FIELD

The present disclosure relates to systems and machine learning models for automated vehicle monitoring.

BACKGROUND

Vehicle monitoring data may be useful in various contexts. For example, usage-based insurance (UBI) has increased in popularity recently, as insurance companies change their pricing models from fixed premiums (e.g., which slightly vary according to age group, etc.), to personalized models based on driving behavior. Each trip for a specified driver is scored, and some incentives may be generated based on the score or cumulative scores during a time period.

Most insurance companies use a heuristic approach to calculate driving scores based on a number of harsh driving events, speeding events, etc., where manually crafted equations are used to calculate the score. Therefore, the scores may only capture predefined events, and may not be suited as an indicator for overall driving behavior. The score processing is often performed by cloud computing servers after the trip is finished.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An example computer system may include memory hardware configured to store a machine learning model, historical driving data vector inputs, and computer-executable instructions, wherein each historical driving data vector input includes at least one sensed driving input indicative of desired driving behavior. The system includes processor hardware configured to execute the instructions, wherein the instructions include training the machine learning model with the historical driving data vector inputs to generate a reconstructed driving data output, wherein the reconstructed driving data output includes at least one reconstruction error score indicative of a likelihood that a driving data input corresponds to a desired driving behavior, obtaining a current driving data input, and supplying the current driving data input to the machine learning model to generate a reconstructed driving data output including a reconstruction error score indicative of a likelihood that the current driving data input corresponds to a desired driving behavior. The instructions may include determining a driving score according to the reconstruction error score, identifying at least one driver notification according to the determined driving score, and transmitting the identified at least one driver notification to a computing device to facilitate storage of the at least one driver notification in a database data structure or display of the at least one driver notification on a user interface.

In other features, the instructions further include obtaining historical contextual driving data vector input, and supplying the historical contextual driving data vector inputs to the machine learning model to train the machine learning model based on the historical driving data vector inputs and the historical contextual driving data vector inputs. In other features, the historical contextual driving data inputs include at least one of weather data, traffic data, and street map data.

In other features, the instructions further include obtaining current contextual driving data input, and supplying the current contextual driving data input to the machine learning model to generate the reconstructed driving data output based on the current driving data input and the current contextual driving data input. In other features, the current contextual driving data input includes at least one of weather data, traffic data, and street map data.

In other features the machine learning model comprises a deep neural network. In other features, the deep neural network comprises an autoencoder. In other features, the historical driving data vector inputs comprise long short-term memory (LSTM) inputs.

In other features, obtaining a current driving data input includes obtaining driving sensor data from a vehicle data collection system, and the vehicle data collection system includes at least one of an on-board integrated sensor of a vehicle, a dashcam coupled with the vehicle, and a mobile device located in the vehicle. In other features, transmitting the identified at least one driver notification includes transmitting the at least one driver notification via an indirect channel, and the indirect channel includes at least one of a social media platform, a news and entertainment platform, and an advertisement platform.

In other features, the instructions further include identifying a driving improvement goal according to the determined driving score, monitoring multiple driving scores relative to the identified driving improvement goal, the multiple driving scores calculated based on multiple reconstruction error scores generated by the machine learning model over multiple time periods, and providing a status notification to a driver via the user interface, based on the monitored multiple driving scores and the identified driving improvement goal. In other features, the instructions further include identifying multiple recommended driving improvement goals according to the determined driving score, displaying the multiple recommended driving improvement goals to a driver via the user interface, and receiving a selection of at least one of the multiple recommended driving improvement goals via the user interface.

In other features, the instructions further include obtaining a driver profile, the driver profile associated with a vehicle corresponding to the current driving data input, obtaining a list of available driving improvement reward items, selecting a subset of the driving improvement reward items based on the obtained driver profile, and presenting the selected subset of the driving improvement reward items to a driver associated with the driver profile, via the user interface. In other features, the driving improvement reward items include at least one of an individual digital reward, a local government incentive reward, and a company incentive reward.

In other features, the instructions further include identifying multiple driver notifications based on multiple determined driving scores, and for each identified driver notification, determining a notification weight according to at least one of a priority associated with the identified driver notification, a time elapsed since a previous driver notification transmission, a notification transmission preference value, and a notification context value, and transmitting the identified driver notification to the computing device to facilitate storage of the identified driver notification in a database data structure or display of the identified driver notification on the user interface, in response to determining that the notification weight satisfies notification transmission criteria. In other features, the instructions further include receiving the notification transmission preference value from a driver via the user interface, and the notification transmission preference value is indicative of a frequency at which the driver would like to receive notifications.

In other features, the instructions further include determining notification context value by obtaining driving context inputs associated with the identified driver notification, determining relative causes of a driving event associated with the identified driver notification according to the driving context inputs and monitored driver behavior, and determining the notification context value according to the determined relative causes of the driving event. In other features, transmitting the identified at least one driver notification includes facilitating storage of the at least one driver notification in a database of a usage-based insurance provider company. In other features, the instructions further include adjusting an insurance premium value according to the at least one driver notification or the determined driving score.

An example computerized method for automated vehicle monitoring includes training a machine learning model with historical driving data vector inputs to generate a reconstructed driving data output, wherein the reconstructed driving data output includes at least one reconstruction error score indicative of a likelihood that a driving data input corresponds to a desired driving behavior, obtaining a current driving data input, and supplying the current driving data input to the machine learning model to generate a reconstructed driving data output including a reconstruction error score indicative of a likelihood that the current driving data input corresponds to a desired driving behavior. The method includes determining a driving score according to the reconstruction error score, identifying at least one driver notification according to the determined driving score, and transmitting the identified at least one driver notification to a computing device to facilitate storage of the at least one driver notification in a database data structure or display of the at least one driver notification on a user interface.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 3A and 3B are graphical representations of example neural networks for automated vehicle monitoring using machine learning models.

In the drawings, reference numbers may be reused to identify similar and/or identical elements.

DETAILED DESCRIPTION

Figure 1:
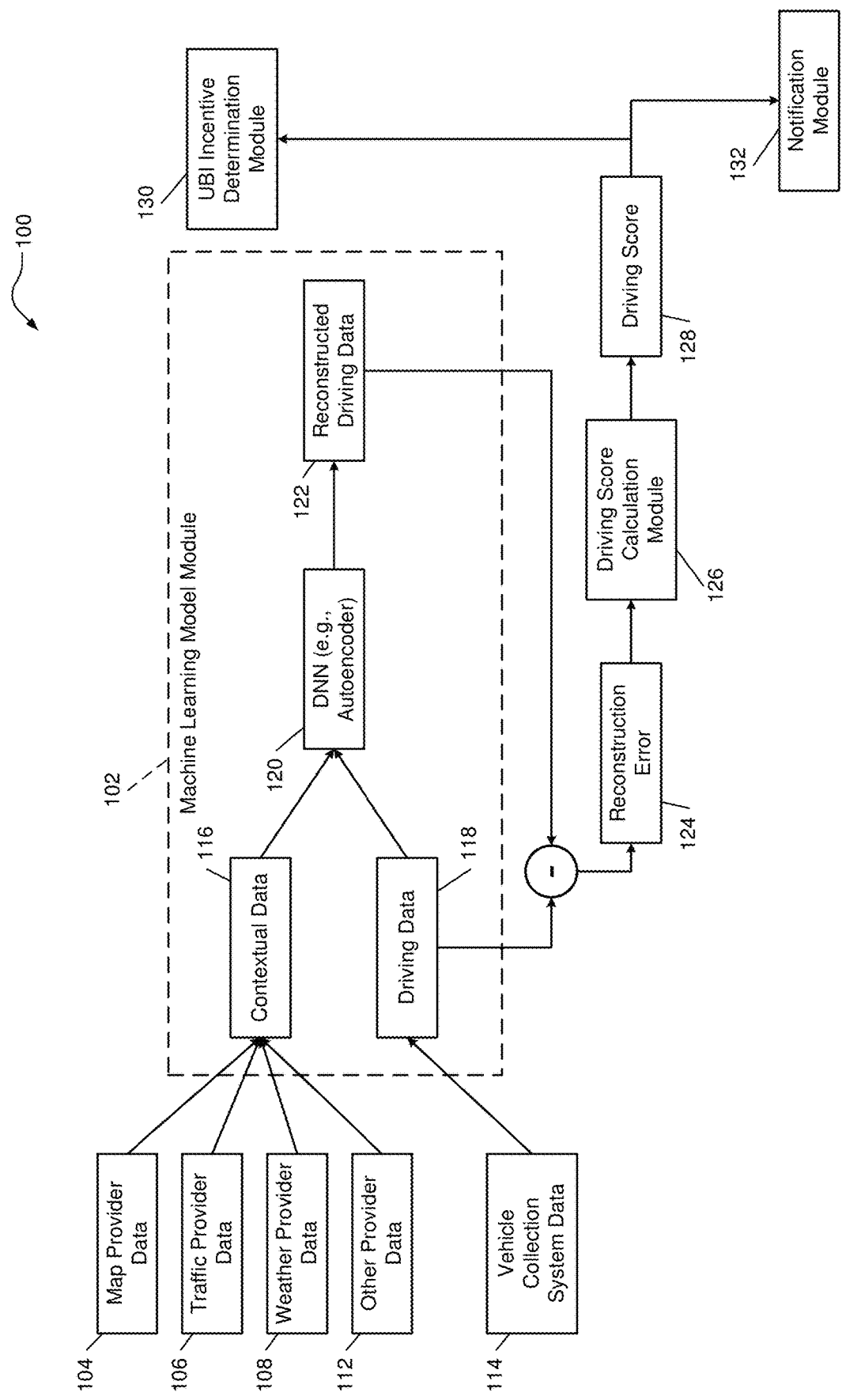
FIG. 1 is a functional block diagram of an example system for automated vehicle monitoring using a machine learning model.

In some example embodiments described herein, systems and methods are disclosed for calculating a vehicle driving score which may be used as a good indicator of overall driving behavior. The example systems and methods may use one or more machine learning models to generate the vehicle driving score, may not use any manual engineering (e.g., the driving score may not be based on a manually crafted equation for different detected driving events), and may be executed in real-time during a vehicle driving trip without using an Internet connection.

For example, a deep neural network model (or other machine learning model) may be trained to efficiently represent driving data from good drivers, such as by obtaining driving data from drivers that are identified, instructed, etc. to drive smoothly and follow traffic rules. The trained model (e.g., neural network) may be able to reconstruct driving data accurately if inputs during a monitored vehicle trip are similar to the ones used for training the model (e.g., the training data from the specifically identified good training drivers), as the training data for the model should include mostly good driving inputs. If the inputs during the monitored trip have a large discrepancy compared to the good driving data, the reconstruction error from the trained model will be large, and the instantaneous driving score generated by the trained model will be low.

The cumulative driving score generated by the trained machine learning model may be a good indicator of total driving behavior. The trained machine learning model may be implemented in real-time on an edge device (e.g., a device located with the vehicle or a driver of the vehicle) to generate instantaneous driver scores which can be used for real-time notification/coaching of the driver.

The device and trained machine learning model may operate without Internet connectivity, although Internet connectivity may be used to optionally obtain contextual information for the model. For example, the model may be trained to generate scores in different contextual situations, such as different weather conditions, different traffic conditions, different locations, etc. In various implementations, a device running the trained machine learning model may obtain contextual information to supply as input to the model along with other vehicle inputs to generate a driving score that is based on the current contextual information (e.g., different inputs may be expected when driving in the rain, versus driving at night, versus driving in traffic, versus driving on the highway, etc.).

In various implementations, a driver coaching system may be used to provide a specified or desired amount of notifications to a driver, to improve driving behavior and make the driver more aware of their driving behaviors. For example, a comprehensive personalized coaching system may keep a driver engaged through interactions, notifications, etc. that are specifically selected for the driver and their preferences. This may avoid situations where too many or too few notifications are sent to the driver (or the notifications are not relevant or accurate for the driver), which could result in the driver feeling less engaged or the driver wanting to ignore notifications.

A system may keep a driver engaged by providing adaptive direct notifications to a driver. For example, notifications may have increased accuracy and be more applicable to a specific driver if the notifications consider the context and circumstances of their occurrence. Notifications may be provided at a rate that is comfortable for the driver, considering the priority of each notification (e.g., based on the importance of the notification, a history of occurrence of each type of notification, etc.). Direct notifications may be sent or provided to a driver directly, such that the driver is aware of their existence (e.g., the driver may be notified in real-time, immediately, within a specified time period after the notification is generated, etc.).

In various implementations, a system may be configured to provide more relevant coaching to a driver, which includes motivation and other complementary methods that are personalized to the driver to enhance an effect of driver coaching. For example, an accurate assessment of a user's driving behavior may facilitate applying relevant goals and motivation (e.g., incentives, rewards, etc.) that are specific to a driver. In order to enhance the coaching effect for drivers, indirect coaching methods may be used to support and compliment direct coaching methods. This may increase a driver's receptiveness to coaching, compared to coaching notifications that include less relevant information, less interesting information, notifications that a driver does not have any reason or motivation to pay attention to, etc.

Automated Vehicle Monitoring System

FIG. 1 is a functional block diagram of an example system 100 for automated vehicle monitoring using a machine learning model. The system 100 may include various computing components, such as one or more processors, one or more memories, etc. The components may be part of a vehicle system, located in a device coupled with a vehicle, separate from a vehicle (e.g., a system for initially training a machine learning model), etc. For example, the system 100 may include a desktop computer, a laptop computer, a tablet, a smartphone, a database, a server, a cloud computing infrastructure, etc.

As shown in FIG. 1, the machine learning model module 102 is configured to receive map provider data 104, traffic provider data 106, weather provider data 108, other provider data 112, and vehicle collection system data 114. The machine learning model module 102 may be an implementation of a system for training a machine learning model based on stored data in a first context, and may be an implementation of a system for monitoring driver behavior in real-time in another context.

For example, in one context the map provider data 104, traffic provider data 106, weather provider data 108, other provider data 112, and vehicle collection system data 114 may be obtained from training drivers (e.g., drivers who are paid or otherwise trained to generate good driving inputs for training and testing a model), and stored in a database. The stored data may then be used to train a model to detect, predict, score, etc. good driving behaviors. In another context, the machine learning model module 102 may receive the map provider data 104, traffic provider data 106, weather provider data 108, other provider data 112, and vehicle collection system data 114 as a driver is operating a vehicle, in order to generate current driving behavior scores for the driver.

As mentioned above, the map provider data 104, traffic provider data 106, weather provider data 108, other provider data 112, and vehicle collection system data 114 may be located in different physical memories within a database, such as different random access memory (RAM), read-only memory (ROM), a non-volatile hard disk or flash memory, etc. In some implementations, the map provider data 104, traffic provider data 106, weather provider data 108, other provider data 112, and vehicle collection system data 114 may be located in the same memory (such as in different address ranges of the same memory). In various implementations, the map provider data 104, traffic provider data 106, weather provider data 108, other provider data 112, and vehicle collection system data 114 may each be stored as structured or unstructured data in any suitable type of data store (e.g., as one or more data structures).

Alternatively, or in addition, the machine learning model module 102 may receive updated data periodically to generate driver scores as a driver is currently operating the vehicle. For example, the machine learning model module 102 may obtain map provider data 104 from a street map provider based on a current location of the vehicle, may obtain traffic provider data 106 from a traffic monitoring service based on a current location and time of day of the vehicle, may receive weather provider data 108 based on a current weather forecast, may receive other provider data 112 from other services based on a current location of the vehicle or a current time of day, etc.

In various implementations, the map provider data 104 may include any suitable data regarding roads around a location of the vehicle, such as a road network of streets in an area of the vehicle, speed limits of roads in the area, conditions of roads in the area (such as current road construction), etc. The traffic provider data 106 may include any suitable traffic-related information associated with a location of the vehicle, such as a traffic flow rate on a road the vehicle is using, average vehicle speeds of other vehicles on the road, current accidents of other vehicles, etc.

The weather provider data 108 may include any suitable information about current weather conditions, such as whether there is current or recent rain, snow, fog, hail, etc., current or recent temperatures, etc. The other provider data 112 may include any other suitable contextual data that may affect driving behavior, such as the occurrence of weekends or holidays, sunrise and sunset times for the current dates, etc.

The map provider data 104, traffic provider data 106, weather provider data 108, other provider data 112, and vehicle collection system data 114 may be combined to generate contextual data 116, which may be used by the machine learning model module 102 to evaluate contextual information that may affect driving behavior. For example, the machine learning model module 102 may take into account whether there is current traffic, whether it is raining, etc., when determining how to score driving behavior. Although FIG. 1 illustrates the contextual data 116 as including each of the map provider data 104, traffic provider data 106, weather provider data 108, and other provider data 112, in other implementations, the contextual data 116 may include more or less (or none) of these types of information.

The vehicle collection system data 114 may include any suitable data that can be collected by a sensor of the vehicle, or a sensor coupled with the vehicle. For example, the vehicle collection system data 114 may include global positioning system (GPS) location data collected by the vehicle or a GPS unit coupled with the vehicle (or a GPS antenna of a smartphone located in the vehicle), accelerometer data, gyroscope data, speedometer data, data from an advanced driver assistance system (ADAS) (e.g., a distance to a vehicle in front of the driver's vehicle), etc. The vehicle collection system data 114 may be obtained as driving data 118.

When the machine learning model module 102 is operating to generate a score for a current driver, the driving data 118 (and optionally the contextual data 116) may be collected periodically (e.g., in real-time intervals), in order to generate a driver score. When the machine learning model module 102 is being used to train a model to predict or score good driving behavior, the driving data 118 (and optionally contextual data 116) may be collected during an input generation driving session from a training driver, and stored for later use to train a machine learning model. For example, the driving data may be stored as historical driving data vector inputs, and the contextual data may be stored as historical contextual driving data vector inputs.

Although FIG. 1 illustrates using both contextual data 116 and driving data 118 to train the model (or score current driving behavior), in various implementations only the driving data 118 may be used to score driving behavior or train a machine learning model. For example, some machine learning models may be trained to score driving behavior based on driving inputs alone without contextual data, and other machine learning models may be trained to score driving behavior based on driving data combined with one or more contextual inputs when the one or more contextual inputs are available to the machine learning model module 102 (e.g., based on a data connection to a map service provider, a traffic monitoring service provider, a weather service provider, etc.).

In various implementations, users may train a machine learning model by accessing the machine learning model module 102 via a user device. The user device may include any suitable user device for displaying text and receiving input from a user, including a desktop computer, a laptop computer, a tablet, a smartphone, etc. In various implementations, the user device may access a database or the machine learning model module 102 directly, or may access a database or the machine learning model module 102 through one or more networks. Example networks may include a wireless network, a local area network (LAN), the Internet, a cellular network, etc.

The machine learning model module 102 may be used to train a machine learning model, such as a deep neural network 120 (e.g., autoencoder). For example, the machine learning model may use pre-recorded driving data 118 and contextual data 116 to train the network 120 to reproduce the input driving data 118.

The trained network 120 may reconstruct the good driving data with high accuracy. For example, the network 120 may be trained to generate reconstructed driving data 122 as an output, where a comparison of the reconstructed driving data 122 to the input driving data 118 creates a reconstruction error 124. The reconstruction error 124 may be used by a driving score calculation module 126 to generate a driving score 128.

For example, if the driving data 118 includes input from the vehicle collection system data 114 based on good driving behavior, the reconstructed error 124 after supplying the driving data 118 to the network 120 may be low. In contrast, if the driving data 118 includes input from the vehicle collection system data 114 based on bad driving behavior (e.g., including too much speeding, too much acceleration, too much hard braking, etc.), the reconstruction error 124 after supplying the driving data 118 to the network 120 may be high.

In various implementations, the network 120 may be trained to reproduce categorical driving data. For example, the network 120 may be trained to provide reconstructed driving data 122 that generates a reconstruction error 124 specific to speed. If the speed-specific reconstruction error 124 is large, the output may indicate that the driver is driving much higher or lower than the speed limit.

The input raw driving data 118 may be supplied to the network 120 in any suitable manner, such as input adapted for a long short-term memory (LSTM) module. The period window for the input may be chosen empirically, such as ten seconds with five seconds overlapping, etc. Contextual data can be encoded in any suitable manner, such as scalars during the period window.

In a later phase, the additional good behavior driving data 118 may be fed into the network 120 for further improvement of the trained machine learning model. In various implementations, a small portion of outliers should not affect the performance of the network 120 since the network 120 may be trained to reduce the overall reconstruction error 124, which should not overfit.

In a testing phase, the network 120 may operate in an attempt to reproduce the input driving data 118. The driving score calculation module 126 may be used to calculate a driving score 128 (e.g., an instantaneous driving score) based on the reconstruction error 124.

The driving score 128 may be calculated from the reconstruction error 124 (e.g., an error scalar) using any suitable calculation algorithm. For example, since the driving score 128 may be reverse proportional to the reconstruction error 124, the driving score calculation module 126 may take a reverse of the reconstruction error 124, and normalize it to a number between 0 and 1 using, e.g., a sigmoid function. This driving score 128 may then be used, e.g., for real-time warnings to the driver, for coaching purposes, etc. For example, a notification module 132 may generate notifications to be provided to the driver based on the driving score 128.

In various implementations, an overall score for the driver may be obtained using weighted averages, or other suitable methods. A driving score 128 for a trip may be aggregated for certain time periods (e.g., one month), in order to adjust insurance premiums, etc. For example, a usage-based insurance (UBI) determination module 130 may receive the driving score 128 aggregated over a time period, and make adjustments to insurance premiums periodically based on driver behavior. In various contexts (e.g., due to regulations, etc.), it may not be useful or possible to provide usage-based insurance and/or insurance based on collected driving data.

It should be apparent that various example systems described herein may be used in applications that do not include insurance.

Figure 2:
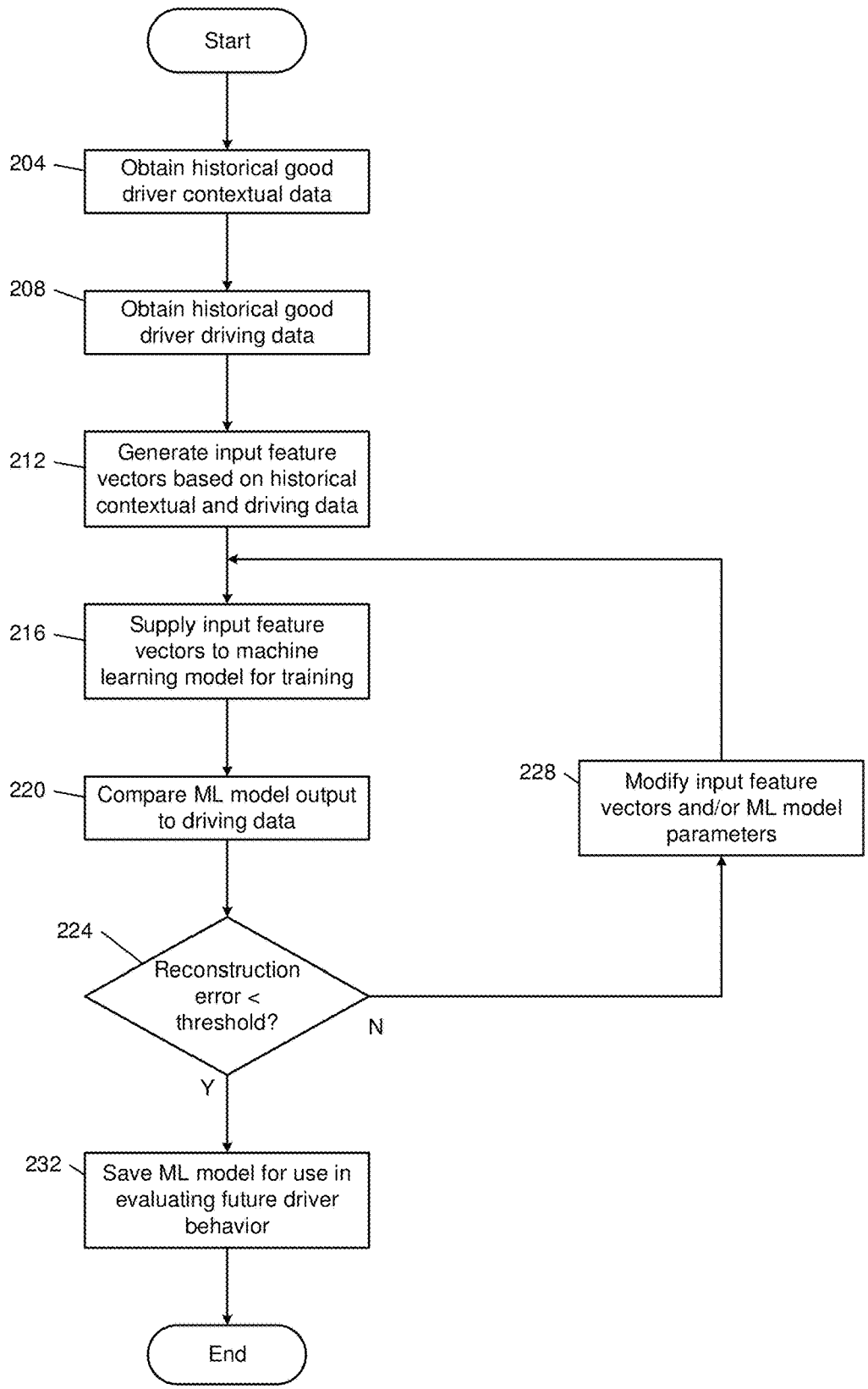
FIG. 2 is a flowchart depicting an example process for training a machine learning model to monitor vehicle driving using the system of FIG. 1.

FIG. 2 is a flowchart depicting an example method for training a machine learning model to monitor driving behavior. At 204, control begins by obtaining historical good driver contextual data. For example, control may obtain one or more of the map provider data 104, traffic provider data 106, weather provider data 108, other provider data 112, and vehicle collection system data 114, collected during a driving session performed by a training driver instructed or trained to drive using good driving behaviors.

At 208, control obtains historical good driver driving data. For example, control may obtain vehicle collection system data 114 that is collected during a driving session performed by a training driver instructed or trained to drive using good driving behaviors.

Control then generates input feature vectors based on the historical contextual and driving data, at 212. The input feature vectors are supplied to the machine learning model for training at 216. Although some example embodiments are described herein using a deep neural network (e.g., autoencoder) and LSTM inputs, other embodiments may use any suitable machine learning model architecture, any suitable model inputs, etc.

At 220, control compares the machine learning model output to driving data. For example, control may compare an output of reconstructed driving data 122 of the machine learning model to historical driving data 118, to generate the reconstruction error 124.

Control determines at 224 whether the reconstruction error is less than a specified threshold. If not, control modifies the input feature vectors 228 and/or parameters of the machine learning model (e.g., the network 120 of FIG. 1), and retrains the machine learning model. Once the reconstruction error is less than the threshold at 224, control saves the trained machine learning model for use in evaluating future driver behavior, at 232.

In various implementations, a driver score determination module may not require any hand-crafted equations, predetermined thresholds, etc. The driver score determination module may consider contextual information, such as current road conditions, current traffic conditions, current weather conditions, etc. The driving score 128 may be based on actual driving data 118 collected by a vehicle collection system, and may not be based merely on phone usage (e.g., monitoring for texting, talking, accessing the Internet, taking photos, etc.). In various implementations, the system may obtain personal health information input, such as a driver heart rate, whether or not the driver is attentive, driver body temperature, whether or not a driver is distracted, etc.

In some example embodiments, the system 100 may be implemented as an end-to-end architecture without any manual engineering (e.g., the machine learning algorithms may be implemented fully on an edge device side without Internet access). The system 100 may receive more than merely GPS input to generate instantaneous driving scores 128, by using the network 120 to evaluate driving behavior based on a broad input data range including the driving data 118 collected by the vehicle collection system and contextual data 116.

Example Machine Learning Models

Figure 4:
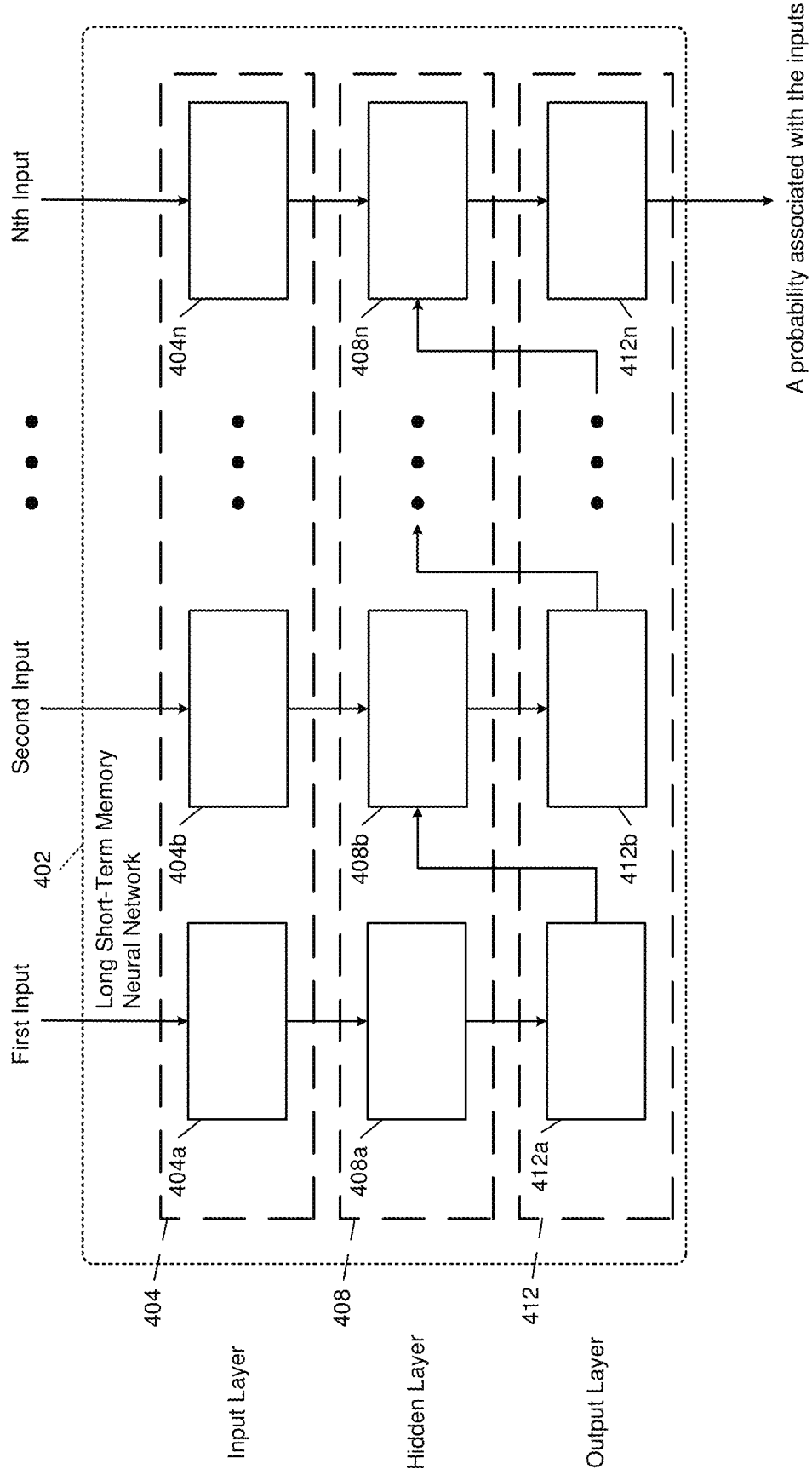
FIG. 4 is a graphical representation of layers of an example long short-term memory (LSTM) machine learning model.
Figure 5:
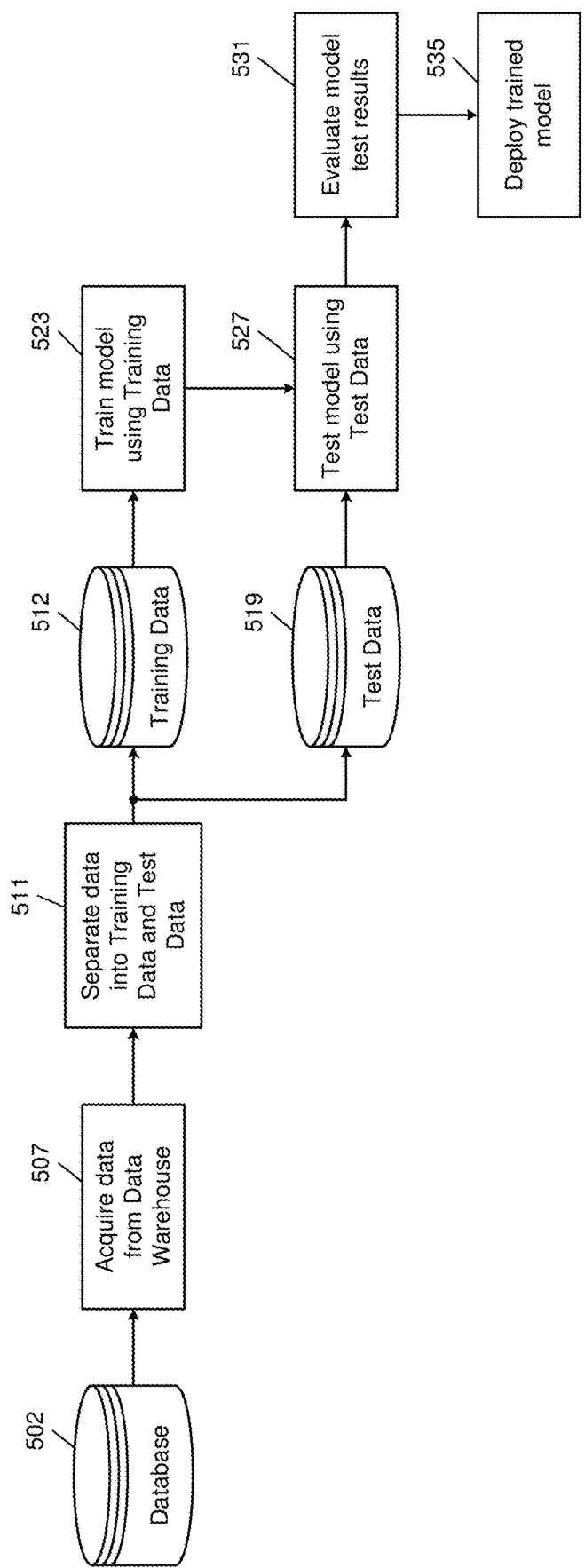
FIG. 5 is a flowchart illustrating an example process for training a machine learning model.

FIGS. 3-5 illustrate example machine learning model details, which may be used with the system 100 (e.g., to train the or implement the network 120 of FIG. 1). FIG. 3A shows a fully connected neural network, where each neuron in a given layer is connected to each neuron in a next layer. In the input layer, each input node is associated with a numerical value, which can be any real number. In each layer, each connection that departs from an input node has a weight associated with it, which can also be any real number (see FIG. 3B). In the input layer, the number of neurons equals number of features (columns) in a dataset. The output layer may have multiple continuous outputs.

The layers between the input and output layers are hidden layers. The number of hidden layers can be one or more (one hidden layer may be sufficient for most applications). A neural network with no hidden layers can represent linear separable functions or decisions. A neural network with one hidden layer can perform continuous mapping from one finite space to another. A neural network with two hidden layers can approximate any smooth mapping to any accuracy.

The number of neurons can be optimized. At the beginning of training, a network configuration is more likely to have excess nodes. Some of the nodes may be removed from the network during training that would not noticeably affect network performance. For example, nodes with weights approaching zero after training can be removed (this process is called pruning). The number of neurons can cause underfitting (inability to adequately capture signals in dataset) or over-fitting (insufficient information to train all neurons; network performs well on training dataset but not on test dataset).

Various methods and criteria can be used to measure performance of a neural network model. For example, root mean squared error (RMSE) measures the average distance between observed values and model predictions. Coefficient of Determination ($R^2$) measures correlation (not accuracy) between observed and predicted outcomes. This method may not be reliable if the data has a large variance. Other performance measures include irreducible noise, model bias, and model variance. A high model bias for a model indicates that the model is not able to capture true relationship between predictors and the outcome. Model variance may indicate whether a model is stable (a slight perturbation in the data will significantly change the model fit).

FIG. 4 illustrates an example of a long short-term memory (LSTM) neural network used to generate models such as those described above, using machine learning techniques. FIG. 4 is a functional block diagram of a generic example LSTM neural network 402. The generic example LSTM neural network 402 may be used to implement a machine learning model, and various implementations may use other types of machine learning networks. The LSTM neural network 402 includes an input layer 404, a hidden layer 408, and an output layer 412. The input layer 404 includes inputs 404a, 404b . . . 404n. The hidden layer 408 includes neurons 408a, 408b . . . 408n. The output layer 412 includes outputs 412a, 412b . . . 412n.

Each neuron of the hidden layer 408 receives an input from the input layer 404 and outputs a value to the corresponding output in the output layer 412. For example, the neuron 408a receives an input from the input 404a and outputs a value to the output 412a. Each neuron, other than the neuron 408a, also receives an output of a previous neuron as an input. For example, the neuron 408b receives inputs from the input 404b and the output 412a. In this way, the output of each neuron is fed forward to the next neuron in the hidden layer 408. The last output 412n in the output layer 412 outputs a probability associated with the inputs 404a-404n. Although the input layer 404, the hidden layer 408, and the output layer 412 are depicted as each including three elements, each layer may contain any number of elements.

In various implementations, each layer of the LSTM neural network 402 must include the same number of elements as each of the other layers of the LSTM neural network 402. In some embodiments, a convolutional neural network may be implemented. Similar to LSTM neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 404a is connected to each of neurons 408a, 408b . . . 408n.

In various implementations, each input node in the input layer may be associated with a numerical value, which can be any real number. In each layer, each connection that departs from an input node has a weight associated with it, which can also be any real number. In the input layer, the number of neurons equals number of features (columns) in a dataset. The output layer may have multiple continuous outputs.

As mentioned above, the layers between the input and output layers are hidden layers. The number of hidden layers can be one or more (one hidden layer may be sufficient for many applications). A neural network with no hidden layers can represent linear separable functions or decisions. A neural network with one hidden layer can perform continuous mapping from one finite space to another. A neural network with two hidden layers can approximate any smooth mapping to any accuracy.

FIG. 5 illustrates an example process for generating a machine learning model (for example, the network 120 of FIG. 1). At 507, control obtains data from a data warehouse, such as a database 502. The data may include any suitable data for developing machine learning models. For example, the map provider data 104, traffic provider data 106, weather provider data 108, other provider data 112, and vehicle collection system data 114 may be used as inputs for training the machine learning model.

At 511, control separates the data obtained from the database 502 into training data 515 and test data 519. The training data 515 is used to train the model at 523, and the test data 519 is used to test the model at 527. Typically, the set of training data 515 is selected to be larger than the set of test data 519, depending on the desired model development parameters. For example, the training data 515 may include about seventy percent of the data acquired from the database 502, about eighty percent of the data, about ninety percent, etc. The remaining thirty percent, twenty percent, or ten percent, is then used as the test data 519.

Separating a portion of the acquired data as test data 519 allows for testing of the trained model against actual output data, to facilitate more accurate training and development of the model at 523 and 527. The model may be trained at 523 using any suitable machine learning model techniques, including those described herein, such as random forest, generalized linear models, decision tree, and neural networks.

At 531, control evaluates the model test results. For example, the trained model may be tested at 527 using the test data 519, and the results of the output data from the tested model may be compared to actual outputs of the test data 519, to determine a level of accuracy. The model results may be evaluated using any suitable machine learning model analysis, such as the example techniques described further below.

After evaluating the model test results at 531, the model may be deployed at 535 if the model test results are satisfactory. Deploying the model may include using the model to make predictions for a large-scale input dataset with unknown outputs. If the evaluation of the model test results at 531 is unsatisfactory, the model may be developed further using different parameters, using different modeling techniques, using other model types, etc.

Figure 6:
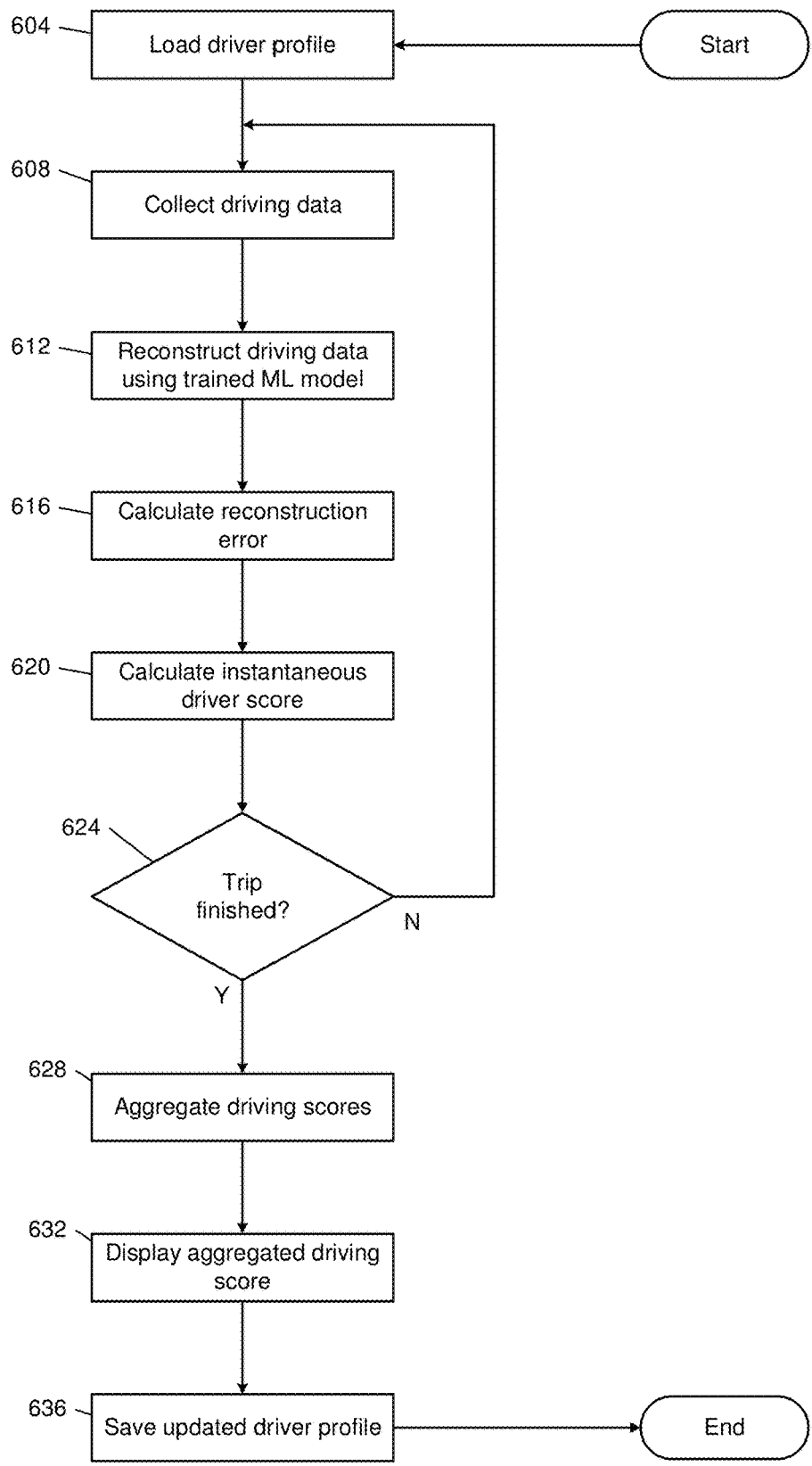
FIG. 6 is a flowchart depicting an example process for monitoring vehicle driving during a trip.

FIG. 6 is a flowchart depicting an example process for monitoring vehicle driving during a trip. Control begins at 604 by loading a driver profile. For example, the driver profile may include information about past driving behavior of the driver, identification information of the driver, location information of the driver, etc.

At 608, control collects driving data. For example, control may collect the vehicle collection system data 114 of FIG. 1, one or more of the map provider data 104, the traffic provider data 106, the weather provider data 108, the other provider data 112, etc. Therefore, the data supplied to the machine learning model may include driving and contextual data, or driving data only.

Control reconstructs driving data using the trained machine learning model at 612. For example, control may use the network 120 of FIG. 1 to generate an output including the reconstructed driving data 122. Control then calculates a reconstruction error at 616.

In various implementations, control may compare the reconstructed driving 122 output by the network 120 to input driving data 118, to generate a reconstruction error 124. At 620, control calculates an instantaneous driving score. For example, control may use the driving score calculation module 126 of FIG. 1 to calculate a driving score 128 based on the reconstruction error 124.

At 624, control determines whether the trip is finished (e.g., whether the driver has completed operation of the vehicle for one trip). This determination may occur based on any suitable criteria, such as the vehicle stopping for more than a specified period of time, the vehicle being turned off, the vehicle being placed in park, etc.

If control determines at 624 that the trip is not finished (e.g., because the vehicle is still being operated), control returns to 608 to collect more driving data and continue calculating new instantaneous driving scores. Once control determines at 624 that the trip is finished, control proceeds to 628 to aggregate the driving scores.

For example, control may generate an aggregated driving score based on an average of the instantaneous driving scores calculated throughout the trip, may generate an aggregated driving score based on specified time periods (e.g., one week, one month), may generate multiple aggregated driving scores corresponding to different portions of a trip, etc.

At 632, control displays the aggregated driving score. For example, the aggregated driving score may be displayed on a user interface of a device connected with the vehicle, the aggregated driving score may be transmitted for display on a user device, etc. Control saves the updated driver profile at 636. For example, the driver profile may be updated based on the aggregated driving score, and the updated driver profile may be used by, e.g., the UBI incentive determination module 130 of FIG. 1, to adjust an insurance premium of the driver associated with the driver profile.

Personalized Driver Coaching System

Various example embodiments include automated systems that may provide personalized notifications (e.g., coaching) to a driver. For example, the system 100 may include an assessment module that evaluates or reevaluates a user's driving behavior, to identify areas that could use improvement.

Based on the evaluation, the system may provide incentives through rewards, recognition, avoiding losing benefits (e.g., insurance discounts), other discounts such as rental cars, employer/group incentives, etc. The system may, according to the assessment, identify areas for a driver to focus during a next time period. For example, if a driver is considered to exhibit good driving behavior based on an output of the network 120, a goal may be set of maintaining the driver's record, and the system may provide insights regarding circumstances specific to the driver. A driver may be able to select a goal, or the user may be presented with options to agree to recommended goals, in order to increase the changes of the driver buying-in to trying to attain a next set goal.

The system 100 may be configured to send direct notifications to the driver, such as explicit notifications or communications based on the user's driving behavior as determined by the network 120. Additionally, or alternatively, the system 100 may be configured to provide indirect notifications, such as communicating in indirect or subtle approaches that reinforce a current goal and address driving events determined by the network 120.

As described further below, the system 100 may use any suitable platform architecture, including a vehicle dashboard implementation, a dashcam, a personal mobile device, an Internet connection, etc. In various implementations, vehicle driving data may be obtained from one or more of driving data sensors or a recorder integrated in a vehicle a dashcam, a personal portable device such as a smartphone, etc.

Driving data may be obtained and stored directly by the automated driver coaching system, or may be obtained from another provider. In some example embodiments, the automated driver coaching system may implement one or more automated coaching functions, including assessment of monitored driver behavior, automated motivation implementation and goal setting, automated notification generation, etc.

The system may communicate with one or more data providers to obtain contextual data for enhancing the driving data for driver behavior monitoring, such as weather service providers, traffic service providers, map providers, event providers, etc. The system may be configured to communicate with one or more engagement platforms to provide automated coaching services to the driver, including but not limited to social media applications and platforms, news and entertainment platforms, advertisement platforms, etc.

Figure 7:
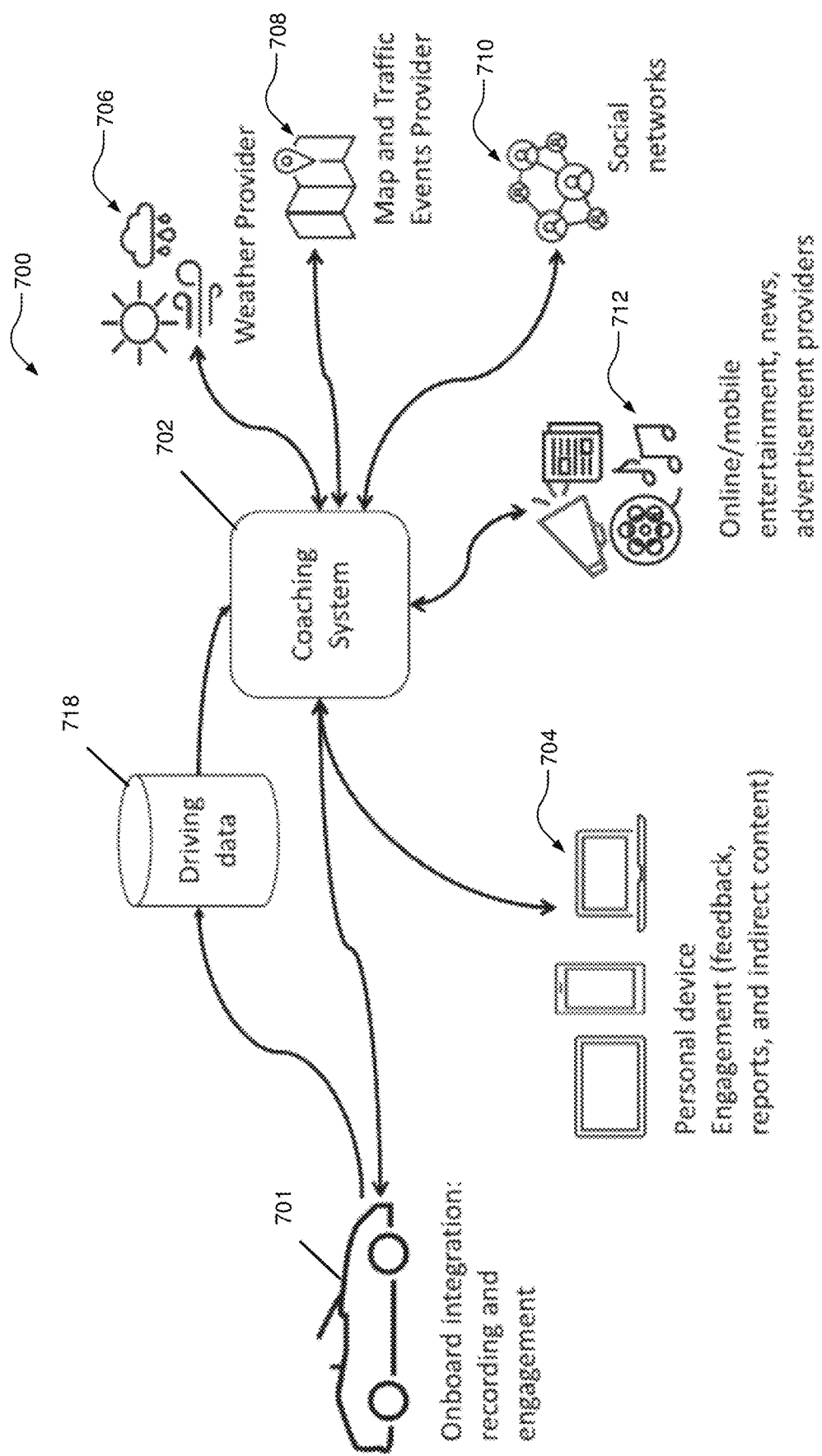
FIG. 7 is a functional block diagram of an example platform for automated driving monitoring using on-board integration.

FIG. 7 illustrates an example platform 700 for automated driver monitoring including an on-board integration architecture. As shown in FIG. 7, the vehicle 701 includes on-board integration that records driving data and provides notifications to the driver. For example, one or more sensors that are integrated with the vehicle may collect data as the user drives the vehicle, to be stored as driving data 718.

The coaching system 702 may include one or more machine learning models for generating a driving score based on, e.g., the driving data 718 collected by the on-board integration sensors of the vehicle. The coaching system 702 may be configured to obtain contextual data from one or more sources.

For example, the coaching system 702 may obtain contextual data from a personal device 704 (such as GPS or accelerometer data from a user's smartphone), from a weather provider 706, from a map and traffic events provider 708, etc. The coaching system 702 may combine contextual data with the driving data 718, to enhance a driving score generated by a trained machine learning model.

The coaching system 702 may provide engagement to the driver through any suitable platform. For example, the coaching system 702 may provide notifications to the driver via on-board integrated user interface (e.g., a dashboard display in the vehicle), the user's personal device 704, a social network 710, an online entertainment or advertisement platform 712, etc.

Figure 8:
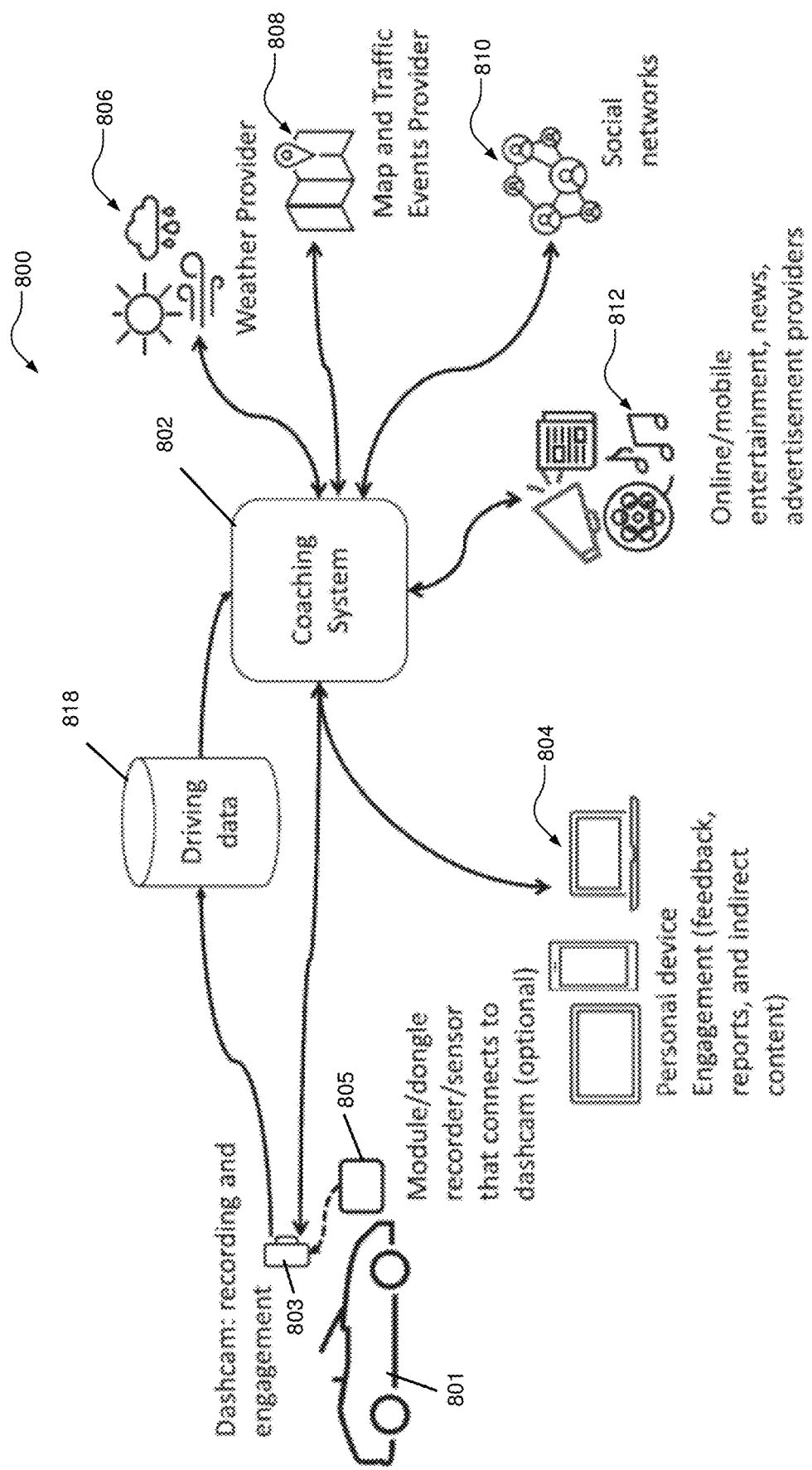
FIG. 8 is a functional block diagram of an example platform for automated driver monitoring using a dashcam.

FIG. 8 is a functional block diagram of an example platform 800 for automated driver monitoring using a dashcam. The platform 800 may be similar to the platform 700 of FIG. 7, but the platform 800 includes a dashcam 803 and optional module 805 that connects to the dashcam 803. For example, the vehicle 801 may or may not provide access to on-board integrated sensors, so the dashcam 803 and optional module 805 may be used to record driving data (e.g., for storage as the driving data 818).

The coaching system 802 may include one or more machine learning models for generating a driving score based on, e.g., the driving data 818 collected by the dashcam 803 and optional module 805. The coaching system 802 may be configured to obtain contextual data from one or more sources.

For example, the coaching system 802 may obtain contextual data from a personal device 804 (such as GPS or accelerometer data from a user's smartphone), from a weather provider 806, from a map and traffic events provider 808, etc. The coaching system 802 may combine contextual data with the driving data 818, to enhance a driving score generated by a trained machine learning model.

The coaching system 802 may provide engagement to the driver through any suitable platform. For example, the coaching system 802 may provide notifications to the driver via the dashcam 803 and optional module 805, the user's personal device 804, a social network 810, an online entertainment or advertisement platform 812, etc.

Figure 9:
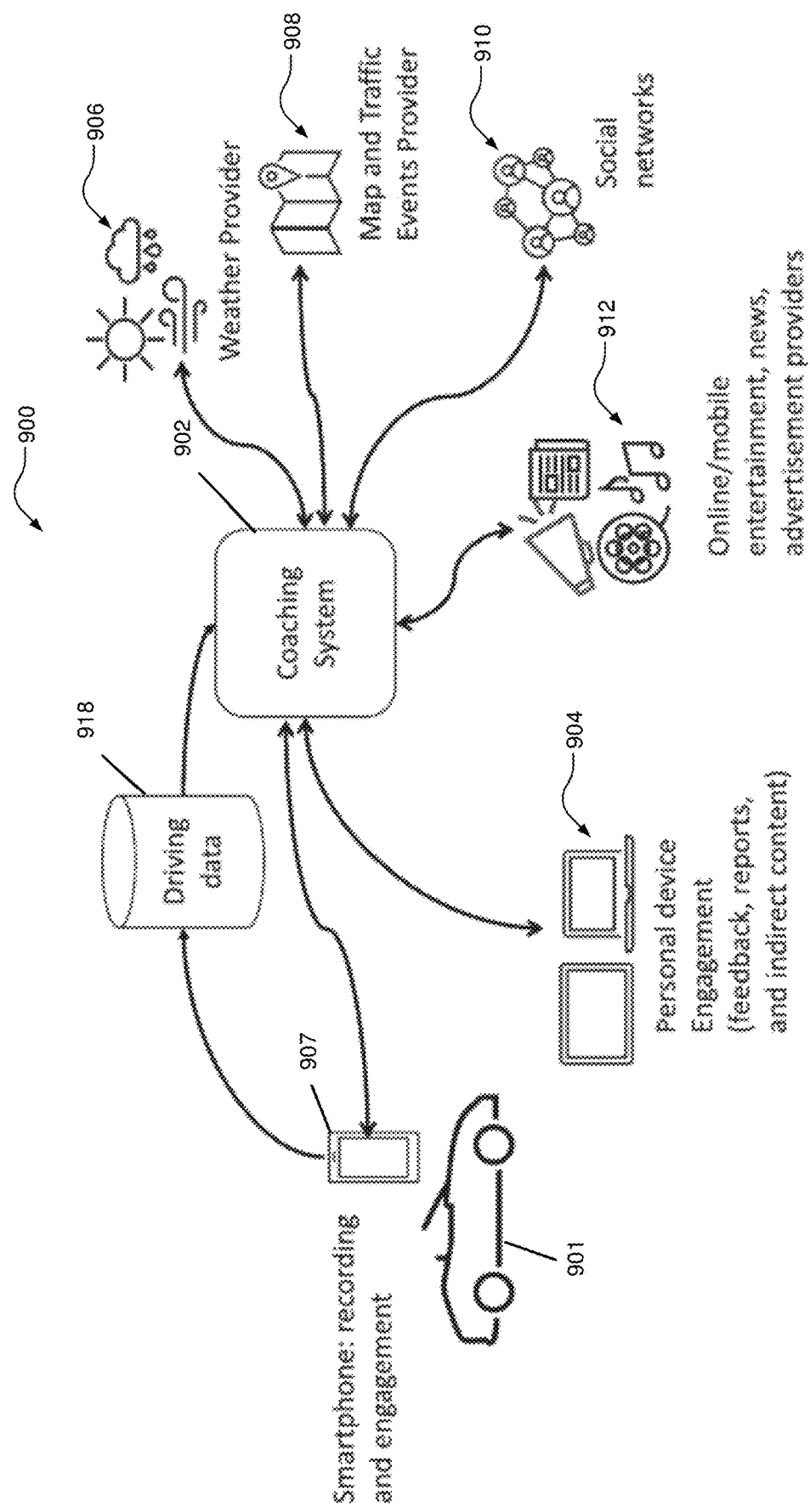
FIG. 9 is a functional block diagram of an example platform for automated driver monitoring using a smartphone.

FIG. 9 is a functional block diagram of an example platform 900 for automated driver monitoring using a smartphone. The platform 900 may be similar to the platform 700 of FIG. 7 or the platform 800 of FIG. 8, but the platform 900 includes uses a smartphone 907 to record vehicle driving data. For example, the vehicle 901 may or may not provide access to on-board integrated sensors, and may or may not include a dashcam, so the platform 900 may use a smartphone located in the vehicle (such as the driver's personal smartphone) to record driving data (e.g., for storage as the driving data 918).

The coaching system 902 may include one or more machine learning models for generating a driving score based on, e.g., the driving data 918 collected by the smartphone 907. The coaching system 902 may be configured to obtain contextual data from one or more sources.

For example, the coaching system 902 may obtain contextual data from a personal device 904, from a weather provider 906, from a map and traffic events provider 908, etc. The coaching system 902 may combine contextual data with the driving data 918, to enhance a driving score generated by a trained machine learning model.

The coaching system 902 may provide engagement to the driver through any suitable platform. For example, the coaching system 902 may provide notifications to the driver via the smartphone 907, the user's personal device 904, a social network 910, an online entertainment or advertisement platform 912, etc.

Figure 10:
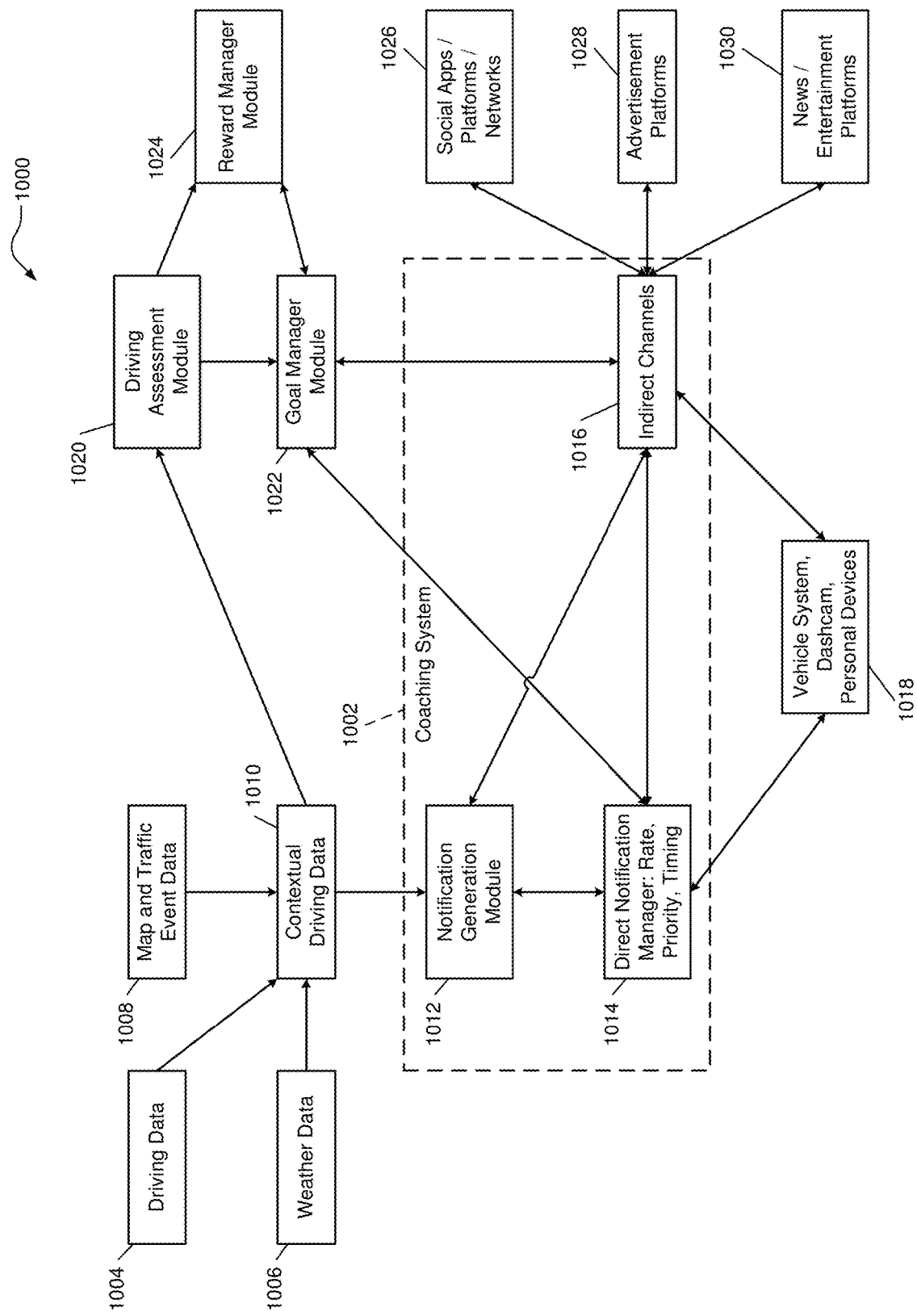
FIG. 10 is a functional block diagram of an example automated notification system.

FIG. 10 is a functional block diagram of an example automated notification system 1000. As shown in FIG. 10, the system 1000 includes a coaching system 1002. The coaching system 1002 includes a notification generation module 1012, a direct notification manager 1014 (e.g., for determining notification rates, priority, timing, etc.), and indirect channels 1016.

The system 1000 obtains driving data 1004, weather data 1006, and map and traffic event data 1008, which may be combined with sensed driving data to form contextual data 1010. For example, driving behavior inputs may be obtained via on-board sensors, a dashcam module, a smartphone, etc., and may be combined with one or more (or none) of the obtains driving data 1004, weather data 1006, and map and traffic event data 1008.

The contextual driving data 1010 may allow the system 1000 to be aware of circumstances and events that occur while the driver is operating the vehicle. For example, the contextual driving data 1010 may notify the system 1000 of a current time (e.g., time of day, date of the year), may identify a general area that the driver is operating the vehicle in and what is considered to be normal driving behavior for the general population in that area, may identify a specific current location of the driver, may identify current weather conditions, may identify current traffic conditions, may allow for a comparison of the driver's behavior to other users driving at the same location and time, etc.

In various implementations, the system 1000 may use the contextual driving data 1010 to determine if a detected abnormal driving event is due to the driver, or if the event may be due to a current location (e.g., due to a hard bump on a rough road) or other external factors. The contextual data insights may be used to reduce notifications for repeated events that occur under the same contextual circumstances, to avoid annoying the driver.

As shown in FIG. 10, the contextual driving data 1010 may be provided to a driving assessment module 1020. For example, the driving assessment module 1020 may evaluate the user's driving behavior, and provide aggregate scores, individual category scoring (e.g., speeding, braking, hard accelerations), etc. The driving assessment module 1020 may user the contextual data to identify a contribution of external factors to a driving score, and a contribution of the driver's actions to a driving score (e.g., a driving score generated based on output of a trained machine learning model such as the network 120 of FIG. 1).

The notification generation module 1012 may receive the contextual driving data 1010. The notification generation module 1012 may be configured to generate notifications based on driver behavior, such as abnormal driving events or scores determined based on the contextual driving data 1010.

The notification generation module 1012 may communicate with the direct notification manager 1014, to determine when to send generated notifications, or whether to inhibit transmission of certain generated notifications. For example, the direct notification manager 1014 may be configured to determine if and how notifications will be delivered, based on, e.g., a history of the specific generated notification (such as how many times the specific notification has already been provided to the user), a context of the driving events (such as whether the notification driving event was largely due to external factors such as the weather or traffic), engagement of the user, current goals, etc.

The notification generation module 1012 and the direct notification manager 1014 may communicate with one or more indirect channels 1016. For example, the indirect channels 1016 may be configured to provide complementary coaching, such as through implicit and indirect methods of providing information to drivers related to their goals. Example indirect channels may include, but are not limited to, social network feeds, news, targeted ads, etc.

The driving assessment module 1020 may provide driving scores to the reward manager module 1024 and the goal manager module 1022, to facilitate determination of appropriate rewards and goals specific to the user's monitored driver behavior. For example, the reward manager module 1024 may be configured to coordinate available rewards with the assessment results from the driving assessment module 1020, to coordinate available rewards with group-wide or areawide objectives, etc.

The goal manager 1022 may be configured to administer goal selection, define smaller milestones, track goal status, etc. For example, goals may be set that relate specifically to an individual driver, goals may be set that take into account higher level objectives such as directing behavior of all drivers in a certain area, or reducing risk of certain demographic groups for an insurance company, etc.

As shown in FIG. 10, the indirect channels 1016 may provide notifications to the user via any suitable channels, including social applications, platforms and networks 1026, advertisement platforms 1028, and news or entertainment platforms 1030.

As one example implementation, a driver Tom has a vehicle that is equipped with the system 1000. Through the assessment by the driving assessment module 1020, he selects a goal of reducing the frequency and the intensity of hard braking events. Tom is also provided a complementary award from his county for reducing the number of times of taking a specific highway. He also selected to receive minimal notifications about his driving.

If a hard brake event happens, Tom's car makes an additional sound through its speakers to pronounce the effect of hard brake, and make Tom more aware of the hard braking event without feeling that he is being overly coached through other notifications. The system 1000 also identified certain areas in Tom's city that are more prone to hard brakes among the general driving population, so Tom is not notified nor penalized for hard brake events in those areas, because Tom's hard brake event frequency is less than the expected frequency of hard brake events for those areas.

Tom typically receives weekly summaries of his driving that also highlight the hard brake events. However, on the rare occasion he has excessive hard brake events for a trip and/or day that are not due to the locations visited, he is notified at the end of the trip/day. Further, about 1 of every 10 or 20 articles or posts in Tom's news and entertainment feed are about recent events involving driving. Tom also receives advertisements for roadside assistance featuring rear end crashes.

Over two weeks, Tom reduces the occurrence of his hard brake events, Tom continues to a next milestone of maintaining the reduced rate of hard brake events. Finally, because Tom used roads other than the highway that the county provided an incentive to avoid, he receives a complementary credit to his local toll card as a reward.

In various implementations, an automated coaching system may be configured to provide personalized coaching for established drivers, and may allow a driver to adjust a level of coaching and feedback. The system may offer non-interactive "gamification" features, such as rewards or recognition when a driver improves their driving score compared to previous driving sessions, or when a driver improves their driving score compared to other drivers, the system may offer flexible reward and motivation methods, etc. For example, the system may consider driving circumstances and context when determining a driving score, and may evaluate an overall coaching goal and a driver's preferences for goal setting and notifications.

In some example embodiments, a system may be configured to anticipate a high likelihood of an event based on contextual circumstances, and notify a driver. This may be based on a history of the contextual circumstances, and not be based on, e.g., an active ADAS system, etc. When events are anticipated, the system may be configured to consider driver preferences for notification rates and coaching goals, and may not notify the driver if the system is configured to increase or maintain driver engagement.

In various implementations, an automated driver coaching system may be configured to calculate feedback information on a device in the vehicle, or a device without an active connection to a network. Notifications/alerts may be prioritized for user engagement, and may be based on a driver's notification preferences and goals. Feedback and coaching notifications may be provided along both direct and indirect channels.

Example systems described herein may not be limited to high-risk/rollover/high crash zones and location specific situations. For example, the systems may provide continuous driving scoring for any roads that the driver may travel on. The system may be configured to evaluate circumstances of the current driving situation including external factors such as time of day, location, driving style of drivers in the general area, current traffic, current weather, etc.

In various implementations, an automated coaching system may be configured to generate notifications for all level of driving behavior from low-risk to higher-risk, and notifications may be defined based on a notification rate setting that is auto-determined, or determined based on driver feedback to maintain high driver engagement. For example, the system may account for whether the driver is driving at night or during inclement weather, if the driver is driving in an unfamiliar area, if the driver is engaging in driving behaviors that pose some risk but are not at the level of risking an imminent rollover or crash, etc.

If a driver has recently received a specific notification, the system may be configured to not send additional notifications to avoid annoying the driver. In some example embodiments, the system may be configured to adapt notification generation based on a driver's natural engagement to avoid annoying a driver, and may provide rewards and goal setting that the driver consents to.

Automated Notification System

Figure 11:
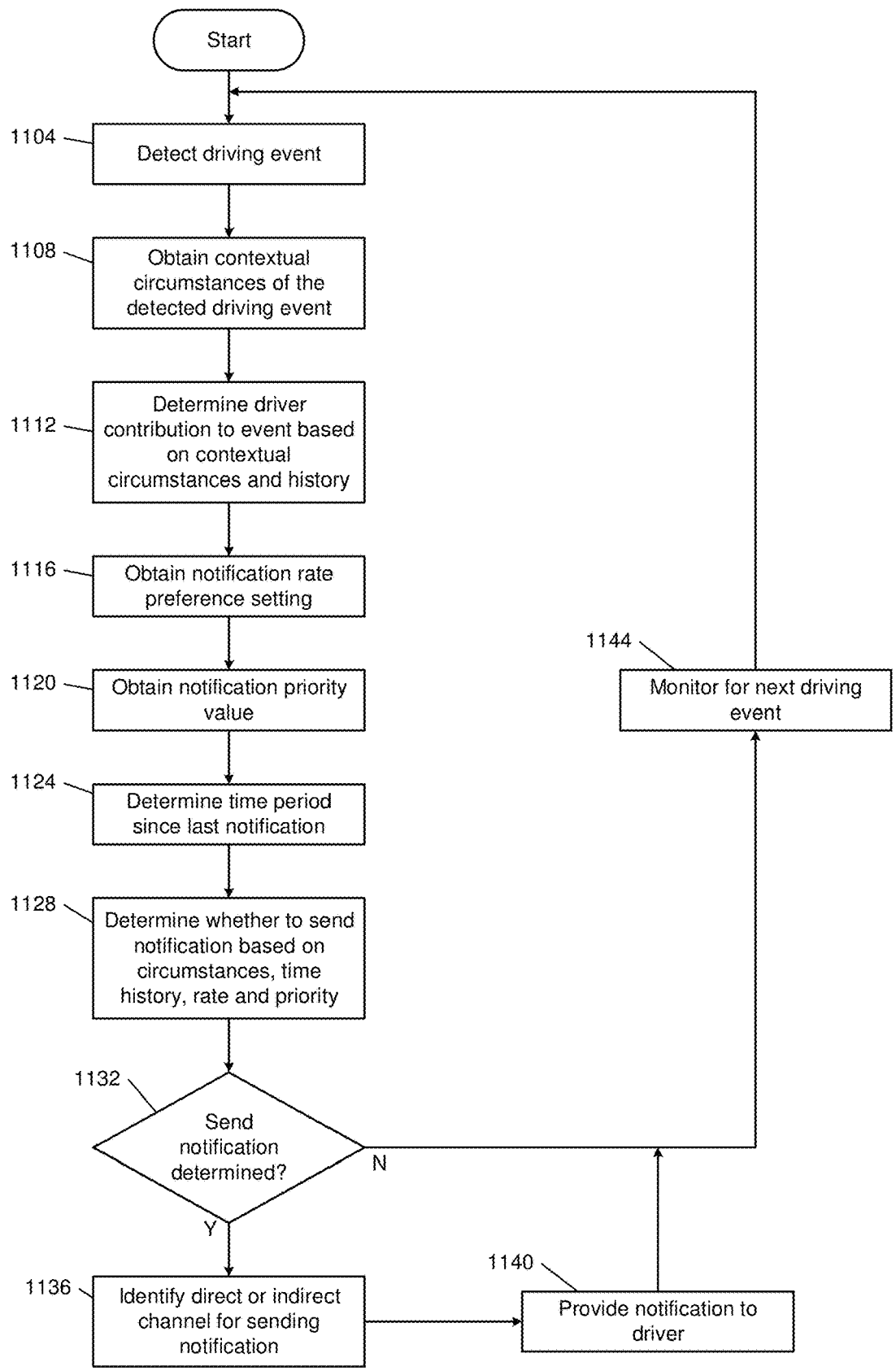
FIG. 11 is a flowchart depicting an example process for automated driving notification generation.

FIG. 11 is a flowchart depicting an example process for automated driving notification generation. Control begins at 1104 by detecting a driving event, such as a poor driving score event determined by an output of the network 120 of FIG. 1.

At 1108, control obtains contextual circumstances of the detected driving event. For example, for each event the system may be aware of as many circumstances that characterize the event as possible. Examples include, but are not limited to, a time that the driving event occurred, a specific location where the driving event occurred and a type of location (e.g., a stop sign intersection, a traffic light intersection, a road, a highway, etc.), expected behavior of other drivers in that location and an overall driving behavior trend/characteristic for the general area that includes the location of the event, current weather conditions, current traffic flow conditions and traffic incidents, a comparison to other drivers that are present at the same location and time, etc.

Control determines a driver contribution to the event based on contextual circumstances and history, at 1112. For example, given the circumstances/context and the history of the event for the driver, control may determine if the event is likely due to the driver or to the location (e.g., a hard bump on a rough road).

As explained further below, control may appropriately notify the driver based on the event history, and the estimated contribution of the driver to the event. For example, if the event was driven primarily by external circumstances, the notifications may advise the driver on how to be alert for those circumstances and, when possible, how to avoid them or reduce their impact. These types of notifications may have a lower priority, and may be indicted to the driver on a weekly or monthly basis, etc. If the event was determined to be likely due to the driver's behavior, a notification may be provided based on the driver's coaching goal, and the driver's notification preferences.

At 1116, control obtains a notification rate preference setting. The notification rate may define a frequency that a user is notified about their driving events. The system may automatically determine a notification rate using any suitable method or combination of methods. For example, a user may provide feedback to determine the preferred rate, such as by indicating that they would like more or less notifications, more or less of a specified notification type, etc.

In various implementations, the system may ask the user how many notifications they would like to receive, such as a slider for selecting values in between none and everything possible. If user settings or user feedback are not provided or not available, the system may assume a notification rate based on, e.g., an overall notification rate for other users of the system, a rate that is derived from other similar demographic drivers, driving profiles and experience levels, etc. The assumed rates may be used as an initial starting point or recommendation when a user setting or preference indication is available.

At 1120, control obtains a notification priority value. Control determines a time period since the last notification at 1124. Control then determines whether to send a notification at 1128, based on one or more of the determined event circumstances, a time history of notifications, a notification rate setting, a notification priority setting, etc.

For example, a direct notification determination may be calculated according to a formula such as Priority=[Risk Item Score]×[Time Since Last Item Notification]×[Time Since Any Notification]×[Priority]×[Notification Level]. The risk item score may be, e.g., a normalized value between 0 and 1, where 1 is a maximum possible value or very high likelihood value, and zero means that the item or event did not occur. Scores between 0 and 1 may indicate a risk level of the driving event, and binary events that either happened or did not happen may be represented as 0 or 1.

A time calculation may include a time since a last notification, within specified thresholds. For example, a recent threshold value of x and a distant threshold value of y may be used. In this example, the time calculation value may be 0 for any amount of time less than x since the last notification (e.g., indicating that no notification should be sent because the last notification was too recent), and may be 1 for any amount of time greater than y since the last notification (e.g., indicating that enough time has passed since the last notification that time should not be considered in weighting the decision of whether or not to send another notification). The time calculation value may be in a range between 0 and 1 when the time since the last notification is between the x and y thresholds (e.g., indicating that a time since the last notification should be considered as a weighted factor when determining whether to send a new notification).

A notification priority may be defined as, e.g., the priority of the notification compared to others. For example, a speed limit event may have a priority of [1], which is greater than a detected hard driving event priority of [0.8], which is greater than a distance event priority of [0.6], which is greater than a night driving event priority of [0.6], which is greater than a duration driving event priority of [0.5], etc. A notification level may include a range from 0 (e.g., do not sent any notifications) to 1 (e.g., show all notifications), and may correspond to an overall notification preference of the driver.

At 1132, control sends or does not send the notification, based on the determination at 1128. For example, if control determines to send the notification, control identifies a direct or indirect channel for sending the notification at 1136. Control then provides a notification to the driver at 1140, based on the selected notification channel. Control may determine whether to send the notification based on whether a notification weight satisfies notification transmission criteria, as described further above (such as whether a determined weight based on all factors related to the notification meets a specified threshold value such as 0.5, 0.8, etc.).

If control determines at 1132 that a notification should not be sent, control proceeds to 1144 to monitor for a next driving event. For example, control may continue monitoring the user's driving behavior until another driving event is detected at 1104.

The example driving events may include, but are not limited to, speeding, night/reduced light driving (e.g., where the user drives for too long in those conditions), driving during inclement weather, a high speed compared to a current traffic flow, hard driving events (e.g., hard braking, hard acceleration, hard steering changes, hard vehicle bumps), driving for too long of a duration or distance in one trip, driving in special zones (e.g., school zones, railroad crossings), using a phone while driving, too many distractions while driving, etc. Related notifications can be generated for each of these example events, or other events.

In some example embodiments, the system may determine whether to send notifications based on different types of notifications. For example, the system may not send a notification about a hard braking event in the evening if the driver was already notified of a hard braking event in the morning, but the system may send a notification about a different type of driving event that occurs in the evening. The system may store all detected driving events in an event log, a database, etc., but may selectively determine to provide only a subset of notifications to the driver.

In various implementations, a driver engagement and coaching system may be configured to evaluate a user's driving behavior, and automatically select goals based on the driving behavior that reduces notifications and makes it easier for the driver to focus on one specific type of driving improvement (or a limited set of driving improvement goals). For example, the system may continuously compare monitored driver behavior to established driving goals, and pick appropriate communication methods from a curated selection of responses that fit the established goals for the driver.

Example engagement method may include driver assessment, rewards, goal setting, indirect coaching, etc. In some example embodiments, the system may collect driving data from a user over a period of time, aggregate data from other drivers, and analyze the data to provide assessment results. For example, data may be aggregated from other drivers located in a same area as the target individual, other drivers having similar demographics, other drivers living in the same city or county, etc.

The assessment may include assessment results of driving behavior at both aggregate and individual category levels. For example, individual categories may be scored such as hard braking, hard acceleration, hard turning, hard bumps, speeding, intersection behavior (e.g., not stopping at a stop sign intersection, not slowing down, accelerating through an intersection), etc.

Individual categories may be compared to other drivers with similar demographics and other drivers located in the same area. For each individual event, the system may be configured to determine whether the event occurrence was due more to external factors or more based on actions of the driver. Goals may be set appropriately to avoid or mitigate the external factors, or to improve the user's driving behavior.

Referring again to FIG. 10, the reward manager module 1024 may be configured to coordinate available rewards with the assessment results, and optionally with groupwide or areawide objectives. Rewards may be located solely within a digital application, such as trophies or achievements, or may include reward sponsored by an employer, an insurance company, a local government, etc.

Flexible reward methods may include any suitable approaches for providing reward incentives to drivers. For example, individual improvement may be recognized through non-monetary digital rewards (e.g., digital medals, trophies, and other collectibles). Individual rewards may be given based on ranking the driver compared to other drivers having similar demographics, a similar location or area, other suitable grouping approaches, etc.

The system may optionally allow redemption (if offered/allowed) of rewards for actual services, products, discounts, etc. The rewards may include unlocking of vehicle or application special features, or access to paid add-ons for a specified time period. The rewards may include targeted rewards or targeted discounts for using a service, for drivers that meet specified criteria. In some example embodiments, the system may be configured to allow a parent, employer, insurance company, organization, government, advertiser, car manufacturer, or other sponsor to provide rewards based on driving improvement metrics.

The goal manager module 1022 may be configured to implement goal selection, a goal level planner, a status tracker, direct and indirect notification management, etc. For example, the goal manager module 1022 may be configured to automatically select a goal for a driver based on their driving behavior, to ask a driver for a preferred goal selection from a list of options, etc.

The goal level panner may be configured to, based on a selected goal, define intermediate milestones that balance achievement and challenge for the diver (e.g., milestones that are not too easy or too difficult for the driver to achieve). The status tracker may be configured to track progress to a current milestone, and advance a driver to a next milestone once each prior milestone is achieved.

A direct notifications manager may be used to communicate a current goal or priority to show appropriate notifications to the deriver. The status tracker may be updated with actual notification to track which notifications were sent to the driver and when. An indirect notifications manager may be used to communicate a current goal/priority for showing relevant information on indirect channels. The identification of content provided to the driver along the indirect channels may be sent to the status tracker, for logging and analysis.

For effective coaching, goals may be defined specifically. This may facilitate driver focus, and allow for reduction of unnecessary notifications and messages that are not related to the current goal. In some example embodiments, the driver may agree to or select one or more of multiple listed goals, in order for the driver to "buy-in" to increase the chances of the selected goal being more effective.

In various implementations, goals may be selected and prioritized by starting with smaller and simpler goals to keep the user engaged and not overwhelmed. As the user responds successfully, the system may be configured to offer more challenging and potentially more complex goals. Each goal may have a corresponding time period, e.g., a day, a week, two weeks, etc.

As mentioned above, the driver may be offered a list of goals. An entity or organization may decide to incentivize specific goals. For example, insurance companies may want to reduce certain driving behaviors or events of their clients. A local city government may want to provide incentives to reduce certain driving behaviors in specified areas and streets. A local business may offer promotions for drivers to use specific location drive-throughs for special events, location assessment, or directing more business to their stores. Local areas may provide "drive-in" promotions to increase visitor traffic during slow seasons with gas discounts/free charging, and other discounts and offers. In some example embodiments, incentives may only be offered to drivers having the lowest driving scores (e.g., to target improved driving behavior for the worst drivers).

Goals may be categorized into various types. For example, personal behavior goal types may be directed to improving or change the user's driving behavior, which may be applicable in most vehicles/streets and other similar circumstances. Group, local or social behavior goals may include driver behavior that goes beyond an individual's driving and serves a larger purpose such as reducing traffic, testing certain streets, new traffic pattern evaluation and confirmation, promotion of products, stores, events, areas, etc. Other examples may include, but are not limited to, social behavior such as the first 50 drivers to arrive or practice a specific driving behavior get a reward, incentivizing drivers to try a new highway, etc. In some implementations, the system may indicate a clear distinction between personal behavior goals and social behavior goals.

Figure 12:
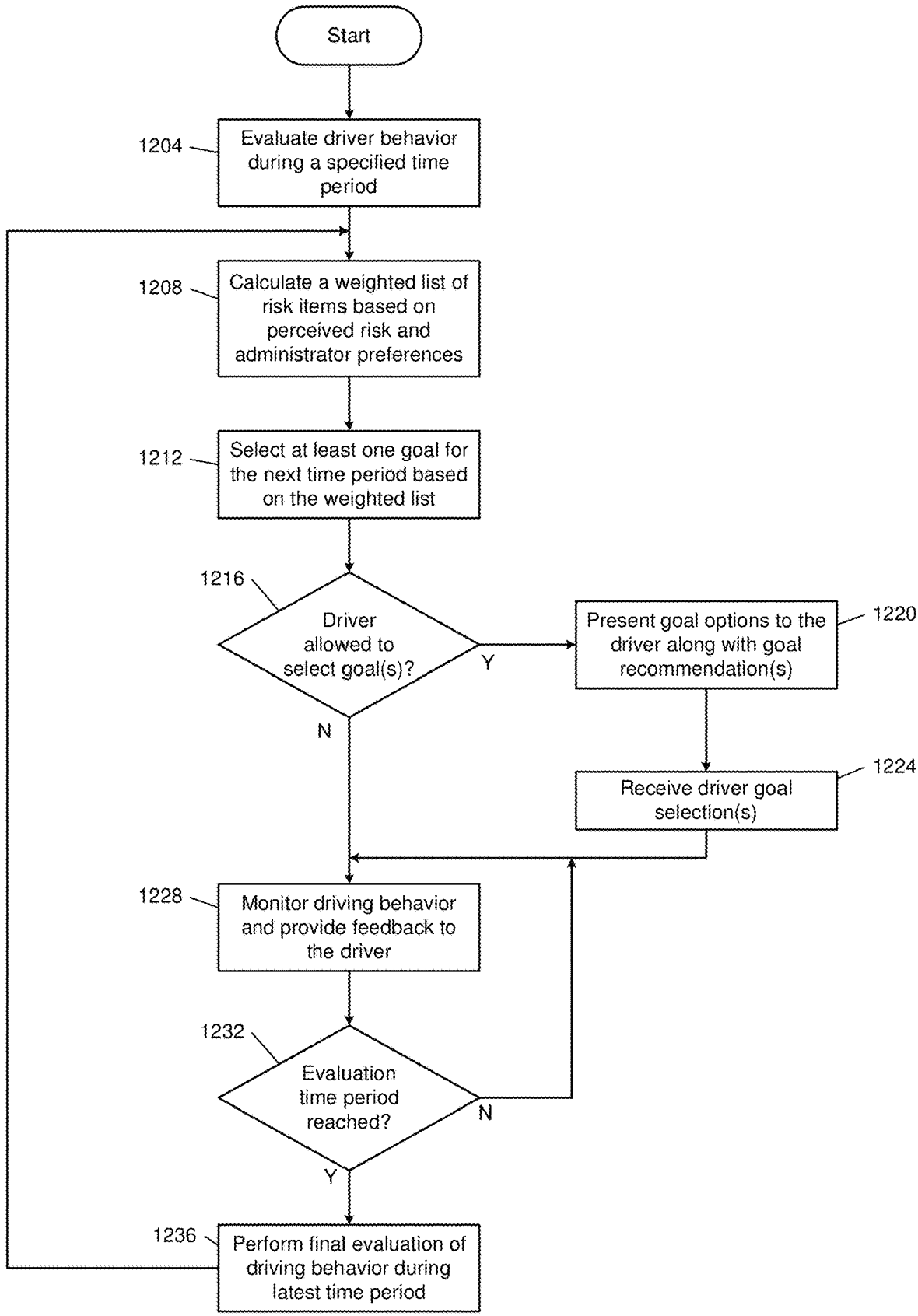
FIG. 12 is a flowchart depicting an example process for automatically adjusting goal setting in an automated driver coaching system.

FIG. 12 illustrates a flowchart depicting an example process for automatically adjusting goal setting in an automated driver coaching system. Control begins at 1204 by evaluating driver behavior during a specified time period.

At 1208, control calculates a weighted list of risk items based on perceived risk and administrator preferences. Control then selects at least one goal for a next time period based on the weighted list. At 1216, control determines whether the system is configured to allow the user to select goals.

If a driver is allowed to select goals at 1216, control proceeds to 1220 to present a list of goal options to the driver. The list of goal options may include specific goals recommended by the system, such as the goal selected at 1212. Control then receives a driver selection of a goal at 1224, which may or may not include a recommended goal.

After receiving the driver selection of one or more goals at 1224, or if control determines at 1216 that the system is not configured to allow for driver selection of goals, control proceeds to 1228 to monitor driving behavior and provide feedback to the driver. At 1232, control determines whether an evaluation timer period has ended. If not, control returns to 1228 to continue monitoring driver behavior and providing feedback to a driver.

Once an end of the evaluation time period is reached at 1232, control proceeds to 1236 to perform a final evaluation of driving behavior during the latest time period. Control then returns to 1208 to calculate a weighted list of risk items at 1208 for the most recent evaluation period.

As mentioned above, the system may be configured to use one or more indirect engagement methods to provide information to a driver. The indirect methods may be more subtle, and may or may not appear to be directly related to the specific driver's behavior and actions. However, the indirect engagement methods are intended to influence driver behavior.

Accordingly, indirect engagement methods may be curated and developed by people familiar with communication and influence techniques, and the available indirect communication methods in the system may be targeted based on their purpose. In various implementations, a large database may be used to avoid repetition of indirect messaging. Neutral material may be provided periodically to make the indirect messaging less obvious.

In various implementations, indirect messaging channels may include playing a funny story or clip that includes a risky driving behavior, which should be perceived as risky driving by most people hearing or seeing the story. News of a high-profile accident or incident may be provided to a user.

In some example embodiments, an indirect messaging channel may include an advertisement for car repairs due to road conditions or collision. This type of advertisement may provide both an advertisement of the specific services, and increased awareness by the driver of the costs in case of road damage or accidents. The indirect messaging channel may include gracefully amplifying the feeling of certain driving behaviors, e.g. adding additional noise when speeding, making a hard bump sound louder, adding a tire screeching sound when hard braking or accelerating events are detected, etc. This may be implemented in a manner that does not suggest a concerning vehicle malfunction/limitation.

In various implementations, indirect coaching channels may include targeted ads that combine purchasing potential for the product/service, with relevance/awareness to a user's driving behavior. For example, if a driver hits bumps a lot, an advertisement for tires and shocks may bring awareness of the costs/consequences to their vehicle, and also make the driver familiar with the services of the tires/shocks company. These ads may be specially crafted to both educate (directly or indirectly) and advertise.

Relevant stories may be added to the driver's social media content or feed. For example, the stories may be selected and tagged to facilitate automatic addition to a driver's feed, based on driving event topics where it is determined that the driver needs to have more awareness and education. Similar to the social feed, news stories relating to driving events/incidents may be provided to a driver, news about new vehicles with safety features or other unique features that may apply to user's interests and driving patterns may be provided to a driver, etc.

As mentioned above, coaching methods may include exaggerating driving perception to enhance the perceived effect of certain driving maneuvers to bring increased awareness to the driver. For example, the system may be configured to use the vehicle speaker system to add extra hitting sounds when a bump is encountered, or extra engine sound noise when a hard acceleration event is detected, etc.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system comprising:
   memory hardware configured to store a machine learning model, historical driving data vector inputs, and computer-executable instructions, wherein each historical driving data vector input includes at least one sensed driving input indicative of desired driving behavior; and
   processor hardware configured to execute the instructions, wherein the instructions include:
   training the machine learning model with the historical driving data vector inputs to generate a reconstructed driving data output, wherein the reconstructed driving data output includes at least one reconstruction error score indicative of a likelihood that a driving data input corresponds to the desired driving behavior;
   obtaining a current driving data input;
   supplying the current driving data input to the machine learning model to generate a reconstructed driving data output including a reconstruction error score indicative of a likelihood that the current driving data input corresponds to the desired driving behavior;
   determining a driving score according to the reconstruction error score;
   identifying at least one driver notification according to the determined driving score; and
   transmitting the at least one driver notification to a computing device to facilitate storage of the at least one driver notification in a database data structure or display of the at least one driver notification on a user interface.

2. The system of claim 1, wherein the instructions further include:
   obtaining historical contextual driving data vector inputs; and
   supplying the historical contextual driving data vector inputs to the machine learning model to train the machine learning model based on the historical driving data vector inputs and the historical contextual driving data vector inputs.

3. The system of claim 2, wherein the historical contextual driving data vector inputs include at least one of weather data, traffic data, and street map data.

4. The system of claim 1, wherein the instructions further include:
   obtaining current contextual driving data input; and
   supplying the current contextual driving data input to the machine learning model to generate the reconstructed driving data output based on the current driving data input and the current contextual driving data input.

5. The system of claim 4, wherein the current contextual driving data input includes at least one of weather data, traffic data, and street map data.

6. The system of claim 1, wherein the machine learning model comprises a deep neural network.

7. The system of claim 6, wherein the deep neural network comprises an autoencoder.

8. The system of claim 1, wherein the historical driving data vector inputs comprise long short-term memory (LSTM) inputs.

9. The system of claim 1, wherein:
   obtaining a current driving data input includes obtaining driving sensor data from a vehicle data collection system; and
   the vehicle data collection system includes at least one of an on-board integrated sensor of a vehicle, a dashcam coupled with the vehicle, and a mobile device located in the vehicle.

10. The system of claim 1, wherein:
    transmitting the at least one driver notification includes transmitting the at least one driver notification via an indirect channel; and
    the indirect channel includes at least one of a social media platform, a news and entertainment platform, and an advertisement platform.

11. The system of claim 1, wherein the instructions further include:
    identifying a driving improvement goal according to the determined driving score;
    monitoring multiple driving scores relative to the driving improvement goal, the multiple driving scores calculated based on multiple reconstruction error scores generated by the machine learning model over multiple time periods; and
    providing a status notification to a driver via the user interface, based on the monitored multiple driving scores and the driving improvement goal.

12. The system of claim 1, wherein the instructions further include:
- identifying multiple recommended driving improvement goals according to the determined driving score;
- displaying the multiple recommended driving improvement goals to a driver via the user interface; and
- receiving a selection of at least one of the multiple recommended driving improvement goals via the user interface.

13. The system of claim 1, wherein the instructions further include:
- obtaining a driver profile, the driver profile associated with a vehicle corresponding to the current driving data input;
- obtaining a list of available driving improvement reward items;
- selecting a subset of the driving improvement reward items based on the driver profile; and
- presenting the selected subset of the driving improvement reward items to a driver associated with the driver profile, via the user interface.

14. The system of claim 13, wherein the driving improvement reward items include at least one of an individual digital reward, a local government incentive reward, and a company incentive reward.

15. The system of claim 1, wherein the instructions further include:
- identifying multiple driver notifications based on multiple determined driving scores;
- determining a notification weight for each of the multiple driver notifications according to at least one of an associated priority, a time elapsed since a previous driver notification transmission, a notification transmission preference value, and a notification context value; and
- transmitting the multiple driver notifications to the computing device to facilitate storage of the multiple driver notifications in a database data structure or display of the multiple driver notifications on the user interface, in response to determining that the notification weight satisfies notification transmission criteria.

16. The system of claim 15, wherein the instructions further include receiving the notification transmission preference value from a driver via the user interface, and the notification transmission preference value is indicative of a frequency at which the driver would like to receive notifications.

17. The system of claim 15, wherein the instructions further include determining the notification context value by:
- obtaining driving context inputs associated with the at least one driver notification;
- determining relative causes of a driving event associated with the at least one driver notification according to the driving context inputs and monitored driver behavior; and
- determining the notification context value according to the determined relative causes of the driving event.

18. The system of claim 1, wherein transmitting the at least one driver notification includes facilitating storage of the at least one driver notification in a database of a usage-based insurance provider company.

19. The system of claim 18, wherein the instructions further include adjusting an insurance premium value according to the at least one driver notification or the determined driving score.

20. A computerized method for automated vehicle monitoring, the method comprising:
- training a machine learning model with historical driving data vector inputs to generate a reconstructed driving data output, wherein the reconstructed driving data output includes at least one reconstruction error score indicative of a likelihood that a driving data input corresponds to a desired driving behavior;
- obtaining a current driving data input;
- supplying the current driving data input to the machine learning model to generate a reconstructed driving data output including a reconstruction error score indicative of a likelihood that the current driving data input corresponds to the desired driving behavior;
- determining a driving score according to the reconstruction error score;
- identifying at least one driver notification according to the determined driving score; and
- transmitting the at least one driver notification to a computing device to facilitate storage of the at least one driver notification in a database data structure or display of the at least one driver notification on a user interface.

* * * * *